US012758461B2

(12) United States Patent
Cansizoglu et al.

(10) Patent No.: US 12,758,461 B2
(45) **Date of Patent: *Oct. 13, 2026**

(54) ENABLING THE VISUALLY IMPAIRED WITH AR USING FORCE FEEDBACK

(71) Applicant: Snap Inc., Santa Monica, CA (US)

(72) Inventors: Omer Cansizoglu, Mercer Island, WA (US); Shariq Zameer, Bothell, WA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/179,368

(22) Filed: Apr. 15, 2025

(65) Prior Publication Data

US 2026/0157916 A1 Jun. 11, 2026

Related U.S. Application Data

(63) Continuation of application No. 17/714,265, filed on Apr. 6, 2022, now Pat. No. 12,295,905.

(Continued)

(51) Int. Cl.
*A61H 3/06* (2006.01)
*G02B 27/01* (2006.01)

(Continued)

(52) U.S. Cl.
CPC ........... *A61H 3/061* (2013.01); *G02B 27/017* (2013.01); *G06F 3/011* (2013.01); *G06F 3/016* (2013.01);

(Continued)

(58) Field of Classification Search
CPC .............. A61H 3/061; A61H 2003/063; A61H 2201/1635; A61H 2201/1604;

(Continued)

(56) References Cited

U.S. PATENT DOCUMENTS 9,024,874 B2 * 5/2015 Stetten .................... G06F 3/014 345/157
9,311,827 B1 4/2016 Alqahtani (Continued)

FOREIGN PATENT DOCUMENTS

JP 2004024853 A 1/2004
WO WO-2019156990 A1 * 8/2019 .............. A61F 9/08

OTHER PUBLICATIONS

1st Chinese Office Action for CN 202280027822.1 dated Dec. 11, 2025, 11 pages (English translation—3 pages).

(Continued)

*Primary Examiner* — Adnan Aziz

(74) *Attorney, Agent, or Firm* — CM Law PLLC; Stephen J. Weed

(57) ABSTRACT

A system and method provide feedback to a user, such as a visually impaired user, to guide the user to an object in the field of view of a camera mounted on a frame worn on the head of the user. A processor identifies at least one object and a body part of the user in the field of view of the camera and tracks relative positions of the body part relative to the identified object. The processor also generates and communicates at least one control signal for guiding the body part of the user to the identified object to a user feedback device worn on or adjacent the body part of the user. The feedback device receives the control signal(s) and converts the control signal(s) into at least one of sounds or haptic feedback that guides the body part to the identified object.

20 Claims, 21 Drawing Sheets

Related U.S. Application Data

(60) Provisional application No. 63/173,848, filed on Apr. 12, 2021.

(51) Int. Cl.
*G06F 3/01* (2006.01)
*G06V 40/10* (2022.01)

(52) U.S. Cl.
CPC ........ *G06V 40/10* (2022.01); *A61H 2003/063* (2013.01); *G02B 2027/0178* (2013.01)

(58) Field of Classification Search
CPC ...... A61H 2201/165; A61H 2201/5092; A61H 2201/5097; A61H 3/06; A61F 9/08; G02B 27/017; G02B 2027/0178; G06F 3/011; G06F 3/016; G06F 3/167; G06V 40/10; G09B 21/003; G09B 21/006; G09B 21/008
See application file for complete search history.

(56) References Cited

U.S. PATENT DOCUMENTS

| | | | |
|---|---|---|---|
| 10,515,484 B1 | 12/2019 | Lucas et al. | |
| 10,539,787 B2 | 1/2020 | Haddick et al. | |
| 11,003,247 B1 | 5/2021 | Sinclair et al. | |
| 12,295,905 B2 | 5/2025 | Cansizoglu et al. | |
| 2014/0176689 A1 | 6/2014 | Lee et al. | |
| 2015/0062000 A1* | 3/2015 | Saito | G06F 3/017 345/156 |
| 2016/0063893 A1 | 3/2016 | Kanuganti et al. | |
| 2016/0078278 A1 | 3/2016 | Moore et al. | |
| 2016/0187654 A1 | 6/2016 | Border et al. | |
| 2016/0259408 A1 | 9/2016 | Messingher et al. | |
| 2016/0267755 A1* | 9/2016 | Martinson | G08B 6/00 |
| 2016/0334879 A1 | 11/2016 | Hirano et al. | |
| 2017/0035645 A1 | 2/2017 | Lydecker et al. | |
| 2017/0262056 A1 | 9/2017 | Osman | |
| 2018/0061276 A1 | 3/2018 | Baca et al. | |
| 2019/0042844 A1 | 2/2019 | Paradiso et al. | |
| 2019/0070064 A1 | 3/2019 | Hogle et al. | |
| 2019/0087050 A1 | 3/2019 | Mani | |
| 2019/0329364 A1 | 10/2019 | Billings et al. | |
| 2020/0167695 A1* | 5/2020 | Buesser | G06V 20/64 |
| 2020/0226814 A1 | 7/2020 | Tang et al. | |
| 2021/0158630 A1 | 5/2021 | Muhammad et al. | |
| 2023/0031913 A1 | 2/2023 | Ishikawa et al. | |
| 2023/0072423 A1 | 3/2023 | Osborn et al. | |
| 2023/0095328 A1 | 3/2023 | Yamano et al. | |
| 2023/0236016 A1 | 7/2023 | Troncoso Aldas et al. | |
| 2023/0341936 A1* | 10/2023 | Inoue | G06F 1/163 |

OTHER PUBLICATIONS

International Search Report and Written Opinion for International Application No. PCT/US2022/023586, dated Jun. 27, 2022 (Jun. 27, 2022)—11 pages.

* cited by examiner

ENABLING THE VISUALLY IMPAIRED WITH AR USING FORCE FEEDBACK

CROSS-REFERENCE TO RELATED APPLICATIONS

This application is a Continuation of U.S. application Ser. No. 17/714,265 filed on Apr. 6, 2022, which claims priority to U.S. Provisional Application Ser. No. 63/173,848, filed on Apr. 12, 2021, the contents of all of which are incorporated herein by reference.

TECHNICAL FIELD

The present subject matter relates to techniques for providing force feedback to a visually impaired user to guide the visually impaired user to an object identified by an eyewear device, e.g., smart glasses.

BACKGROUND

Blind or visually impaired people use Braille, audio recordings, or other non-visual media as an accommodation to consume content.

BRIEF DESCRIPTION OF THE DRAWINGS

The drawings depict implementations, by way of example only, not by way of limitations. In the figures, like reference numerals refer to the same or similar elements. When a plurality of similar elements is present, a single reference numeral may be assigned to the plurality of similar elements with a letter designation referring to specific elements. When referring to the elements collectively or to a non-specific one or more of the elements, the small letter designation may be dropped.

Features of the various examples described will be readily understood from the following detailed description, in which reference is made to the figures. The various elements shown in the figures are not drawn to scale unless otherwise indicated. The dimensions of the various elements may be enlarged or reduced in the interest of clarity. Included in the drawing are the following figures.

DETAILED DESCRIPTION

Figure 1A:
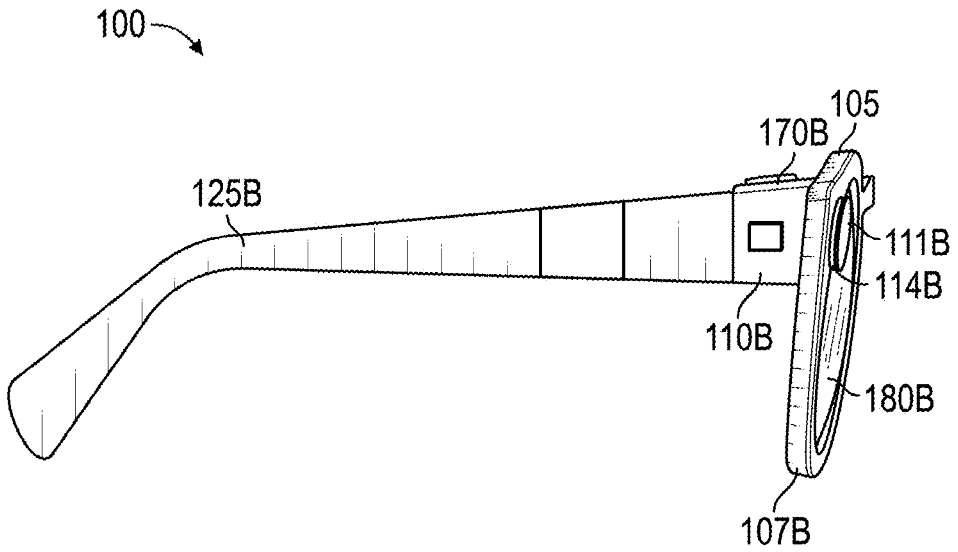
FIG. 1A is a side view of an example hardware configuration of an eyewear device, which shows a right optical assembly with an image display.

In a sample configuration described herein, smart glasses process real time depth data and combine such data with hand gesture data to provide users with the input needed to track/find objects. The smart glasses use object tracking to find items such as a stop sign, a car key, a cup, a door, etc. Then, when the hand of the user intersects with the found object, feedback (e.g., sound or tactile) may be provided to the hand of the user to give the user coarse or granular feedback that guides the user's hand to the object despite being unable to see the object. The type of feedback provided may be in any of a number of forms from a number of different devices. In a simple example, the user may wear gloves with small buzzers at the hand joints that are linked to BLUETOOTH® low energy (BLE) devices for providing one way feedback to the user.

Assistive technologies such as AR glasses provide voice guidance such as reading the content of a page or guiding the user with voice. However, such devices typically do not provide cost-effective precision control that provides improved eye-hand coordination so as to enable visually-impaired users to perform tasks such as picking up an object. Existing AR devices such as smart glasses scan the environment and tag limited objects to inform the users of the AR devices.

Examples of the system and method described herein expand the capabilities of assistive technologies by providing a system and method that provides feedback to a user, such as a visually impaired user, to guide the user to an object in the field of view of a camera mounted on a frame worn on the head of the user. A processor identifies at least one object and a body part of the user in the field of view of the camera and tracks relative positions of the body part relative to the identified object. For example, the target object may be identified by generating a scan of the user's surroundings with the camera and training machine learning models selected based on at least one of the user's input or environment using a data set directed to objects in the scan of the user's surroundings. The processor also generates and communicates at least one control signal for guiding the body part of the user to the identified object to a user feedback device worn on or adjacent the body part of the user. In a sample configuration, the frame, camera, and processor are integrated into smart glasses. The feedback device receives the control signal(s) and converts the control signal(s) into at least one of sounds or haptic feedback that guides the body part to the identified object.

In a first configuration, the feedback device may comprise a glove configured to fit the user's hand and to include at least one sensor adapted to at least one of buzz or vibrate in response to the control signal(s) to guide the user's hand to the identified object. The glove may include a communication module adapted to receive the control signal(s) and to control the at least one sensor to at least one of buzz or vibrate in response to the at least one control signal.

In a second configuration, the feedback device may comprise a smart watch that communicates with at least one sensor on the user's hand adapted to at least one of buzz or vibrate in response to the control signal(s) to guide the user's hand to the identified object. The at least one sensor may comprise a fingertip sensor that receives a control signal from the smart watch via at least one of a wired or wireless connection.

In either configuration, at least one of a voltage or a frequency of the control signal(s) is modulated in accordance with a distance the body part is from the identified object whereby at least one of the sounds or the haptic feedback increases in frequency as the user's body part approaches the identified object and decreases in frequency as the user's body part is moved farther away from the identified object and stops once the user's body part touches the identified object.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

In the following detailed description provided with respect to FIGS. 1-14, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The term "coupled" as used herein refers to any logical, optical, physical, or electrical connection, link, or the like by which signals or light produced or supplied by one system element are imparted to another coupled element. Unless described otherwise, coupled elements or devices are not necessarily directly connected to one another and may be separated by intermediate components, elements or communication media that may modify, manipulate, or carry the light or signals.

The orientations of the eyewear device, associated components and any complete devices incorporating an eye scanner and camera such as shown in any of the drawings, are given by way of example only, for illustration and discussion purposes. In operation for a particular variable optical processing application, the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any optic or component of an optic constructed as otherwise described herein.

Reference now is made in detail to the examples illustrated in the accompanying drawings and discussed below.

Eyewear Device for Tracking Objects

Figure 2A:
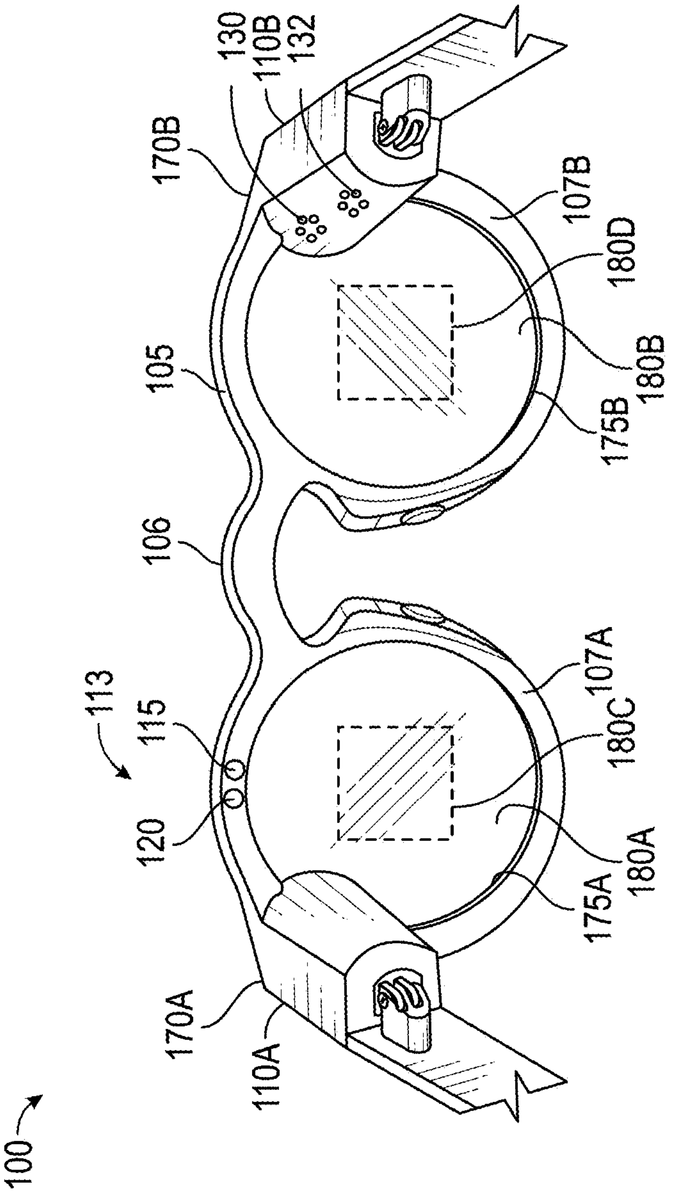
FIG. 2A is a rear view of an example hardware configuration of an eyewear device.

FIG. 1A is a side view of an example hardware configuration of an eyewear device 100 that may be used to process real time depth data and to combine such data with hand gesture data to provide users with the input needed to track/find objects. The eyewear device 100 of FIG. 1A includes a right optical assembly 180B with an image display 180D (FIG. 2A). Eyewear device 100 may include multiple visible light cameras 114A-B (FIG. 7) that form a stereo camera, of which the right visible light camera 114B is located on a right temple portion 110B.

The left and right visible light cameras 114A-B may have an image sensor that is sensitive to the visible light range wavelength. Each of the visible light cameras 114A-B may have a different frontward facing angle of coverage, for example, visible light camera 114B has the depicted angle of coverage 111B. The angle of coverage is an angle range in which the image sensor of the visible light camera 114A-B picks up electromagnetic radiation and generates images. Examples of such visible lights cameras 114A-B include a high-resolution complementary metal-oxide-semiconductor (CMOS) image sensor and a video graphic array (VGA) camera, such as 640p (e.g., 640×480 pixels for a total of 0.3 megapixels), 720p, or 1080p. Image sensor data from the visible light cameras 114A-B are captured along with geolocation data, digitized by an image processor, and stored in a memory.

To provide stereoscopic vision, visible light cameras 114A-B may be coupled to an image processor (element 912 of FIG. 9) for digital processing along with a timestamp in which the image of the scene is captured. Image processor 912 may include circuitry to receive signals from the visible light cameras 114A-B and process those signals from the visible light cameras 114A-B into a format suitable for storage in the memory (element 934 of FIG. 9). The timestamp can be added by the image processor 912 or other processor, which controls operation of the visible light cameras 114A-B. Visible light cameras 114A-B allow the stereo camera to simulate human binocular vision. Stereo cameras provide the ability to reproduce three-dimensional images (e.g., scene 715 of FIG. 7) based on two captured images (e.g., left and right raw images 758A-B of FIG. 7) from the visible light cameras 114A-B, respectively, having the same timestamp. Such three-dimensional images 715 allow for an immersive life-like experience, e.g., for virtual reality or video gaming. For stereoscopic vision, the pair of images 758A-B may be generated at a given moment in time—one image for each of the left and right visible light cameras 114A-B. When the pair of generated images 758A-B from the frontward facing angles of coverage 111A-B of the left and right visible light cameras 114A-B are stitched together (e.g., by the image processor 912), depth perception is provided by the optical assembly 180A-B.

In an example, a user interface field of a view adjustment system includes the eyewear device 100. The eyewear device 100 includes a frame 105, a right temple portion 110B extending from a right lateral side 170B of the frame 105, and a see-through image display 180D (FIGS. 2A-B)

comprising optical assembly 180B to present a graphical user interface to a user. The eyewear device 100 includes the left visible light camera 114A connected to the frame 105 or the left temple portion 110A to capture a first image of the scene. Eyewear device 100 further includes the right visible light camera 114B connected to the frame 105 or the right temple portion 110B to capture (e.g., simultaneously with the left visible light camera 114A) a second image of the scene which partially overlaps the first image. Although not shown in FIGS. 1A-B, the user interface field of view adjustment system further includes the processor 932 coupled to the eyewear device 100 and connected to the visible light cameras 114A-B, the memory 934 accessible to the processor 932, and programming in the memory 934, for example in the eyewear device 100 itself or another part of the user interface field of view adjustment system.

Figure 1B:
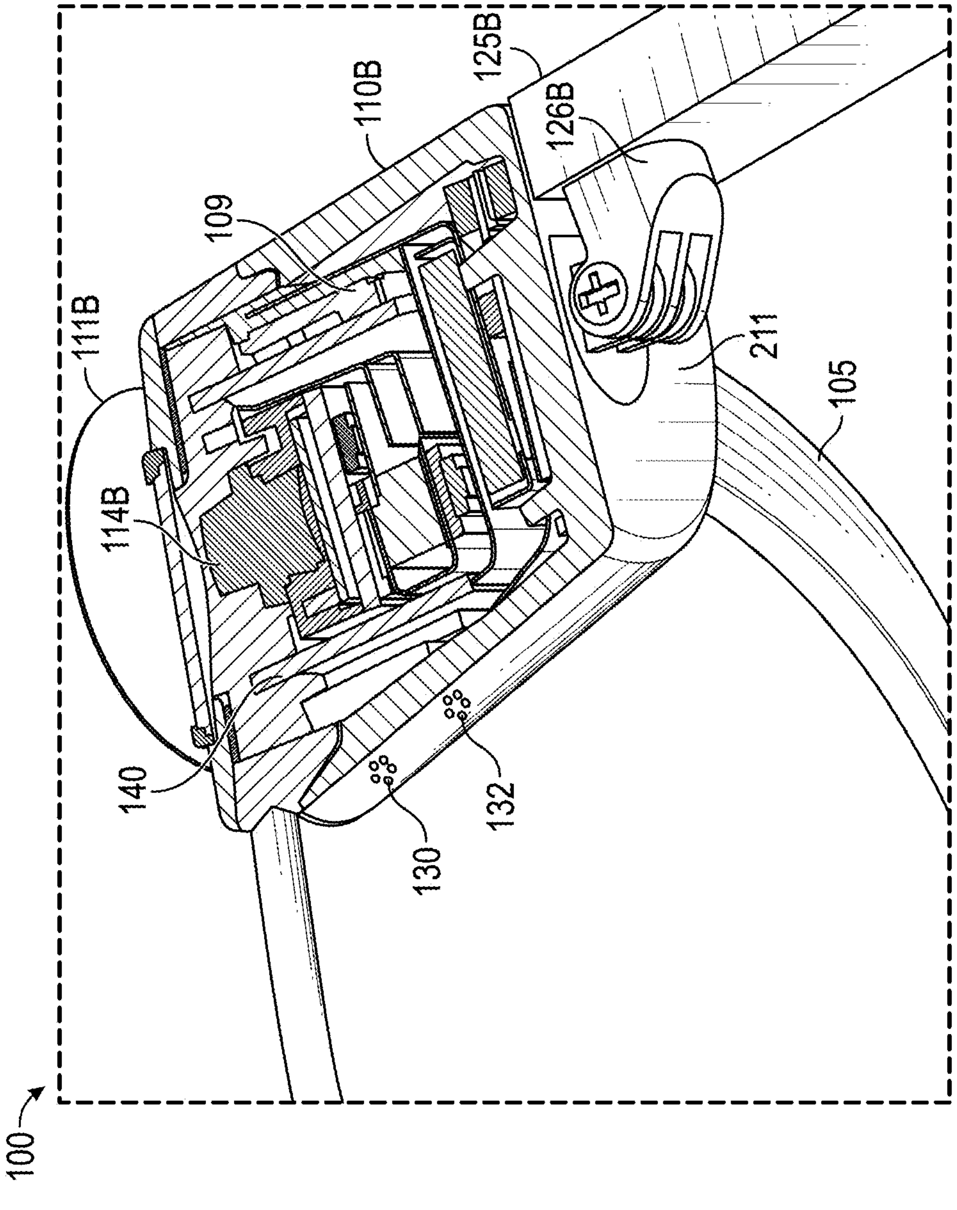
FIG. 1B is a top cross-sectional view of a temple of the eyewear device of FIG. 1A depicting a visible light camera, a head movement tracker for tracking the head movement of the user of the eyewear device, and a circuit board.
Figure 2B:
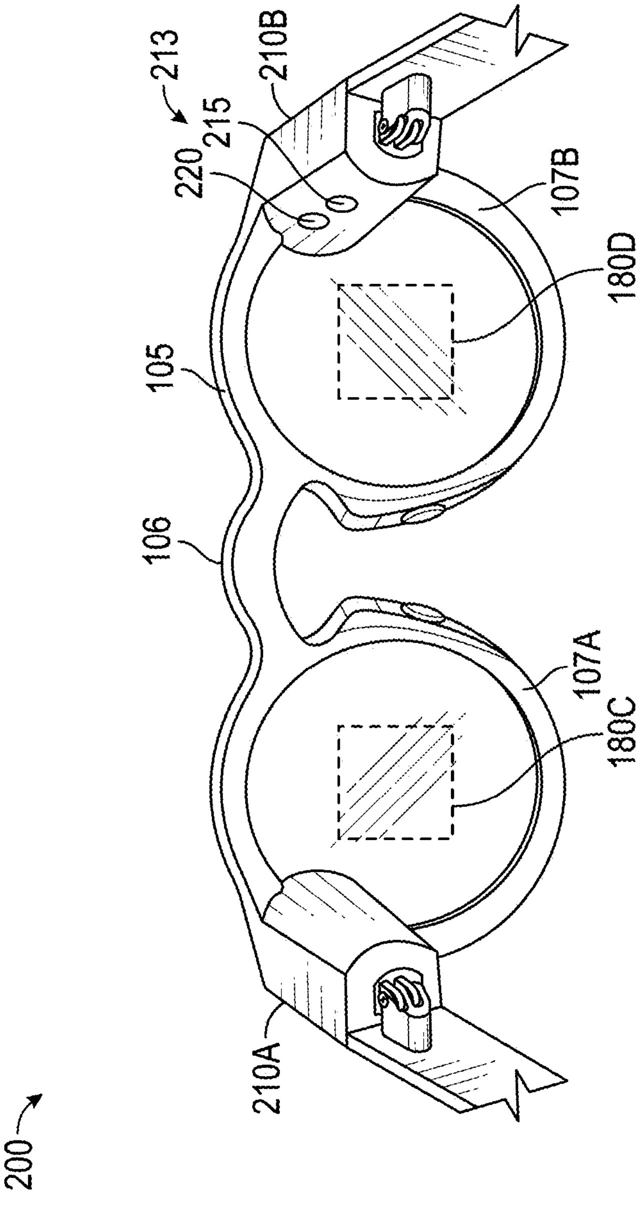
FIG. 2B is a rear view of an example hardware configuration of another eyewear device.

Although not shown in FIG. 1A, the eyewear device 100 may also include a head movement tracker (element 109 of FIG. 1B) or an eye movement tracker (element 213 of FIG. 2B). Eyewear device 100 may further include the see-through image displays 180C-D of optical assembly 180A-B for presenting a sequence of displayed images, and an image display driver (element 942 of FIG. 9) coupled to the see-through image displays 180C-D of optical assembly 180A-B to control the image displays 180C-D of optical assembly 180A-B to present the sequence of displayed images 715, which are described in further detail below. Eyewear device 100 further includes the memory 934 and the processor 932 having access to the image display driver 942 and the memory 934. Eyewear device 100 may further include programming (element 934 of FIG. 9) in the memory. Execution of the programming by the processor 932 configures the eyewear device 100 to perform functions, including functions to present, via the see-through image displays 180C-D, an initial displayed image of the sequence of displayed images, the initial displayed image having an initial field of view corresponding to an initial head direction or an initial eye gaze direction (direction 230 of FIG. 5).

Execution of the programming by the processor 932 further configures the eyewear device 100 to detect movement of a user of the eyewear device by: (i) tracking, via the head movement tracker (element 109 of FIG. 1B), a head movement of a head of the user, or (ii) tracking, via an eye movement tracker (element 113, 213 of FIGS. 2A-B, FIG. 5), an eye movement of an eye of the user of the eyewear device 100. Execution of the programming by the processor 932 may further configure the eyewear device 100 to determine a field of view adjustment to the initial field of view of the initial displayed image based on the detected movement of the user. The field of view adjustment includes a successive field of view corresponding to a successive head direction or a successive eye direction. Execution of the programming by the processor 932 may further configure the eyewear device 100 to generate a successive displayed image of the sequence of displayed images based on the field of view adjustment. Execution of the programming by the processor 932 may further configure the eyewear device 100 to present, via the see-through image displays 180C-D of the optical assembly 180A-B, the successive displayed images.

FIG. 1B is a top cross-sectional view of the right temple portion 110B of the eyewear device 100 of FIG. 1A depicting the right visible light camera 114B, a head movement tracker 109, and a circuit board 140. Construction and placement of the left visible light camera 114A is substantially similar to the right visible light camera 114B, except the connections and coupling are on the left lateral side 170A. As shown, the eyewear device 100 includes the right visible light camera 114B and a circuit board, which may be a flexible printed circuit board (PCB) 140. The right hinge 126B connects the right temple portion 110B to a right temple 125B of the eyewear device 100. In some examples, components of the right visible light camera 114B, the flexible PCB 140, or other electrical connectors or contacts may be located on the right temple 125B or the right hinge 126B.

As shown, eyewear device 100 has a head movement tracker 109, which includes, for example, an inertial measurement unit (IMU). An inertial measurement unit is an electronic device that measures and reports a body's specific force, angular rate, and sometimes the magnetic field surrounding the body, using a combination of accelerometers and gyroscopes, sometimes also magnetometers. The inertial measurement unit works by detecting linear acceleration using one or more accelerometers and rotational rate using one or more gyroscopes. Typical configurations of inertial measurement units contain one accelerometer, gyro, and magnetometer per axis for each of the three axes: horizontal axis for left-right movement (X), vertical axis (Y) for top-bottom movement, and depth or distance axis for up-down movement (Z). The accelerometer detects the gravity vector. The magnetometer defines the rotation in the magnetic field (e.g., facing south, north, etc.) like a compass which generates a heading reference. The three accelerometers to detect acceleration along the horizontal, vertical, and depth axis defined above, which can be defined relative to the ground, the eyewear device 100, or the user wearing the eyewear device 100.

Eyewear device 100 detects movement of the user of the eyewear device 100 by tracking, via the head movement tracker 109, the head movement of the head of the user. The head movement includes a variation of head direction on a horizontal axis, a vertical axis, or a combination thereof from the initial head direction during presentation of the initial displayed image on the image display. In one example, tracking, via the head movement tracker 109, the head movement of the head of the user includes measuring, via the inertial measurement unit 109, the initial head direction on the horizontal axis (e.g., X axis), the vertical axis (e.g., Y axis), or the combination thereof (e.g., transverse or diagonal movement). Tracking, via the head movement tracker 109, the head movement of the head of the user further includes measuring, via the inertial measurement unit 109, a successive head direction on the horizontal axis, the vertical axis, or the combination thereof during presentation of the initial displayed image.

Tracking, via the head movement tracker 109, the head movement of the head of the user further includes determining the variation of head direction based on both the initial head direction and the successive head direction. Detecting movement of the user of the eyewear device 100 further includes in response to tracking, via the head movement tracker 109, the head movement of the head of the user, determining that the variation of head direction exceeds a deviation angle threshold on the horizontal axis, the vertical axis, or the combination thereof. The deviation angle threshold is between about 3° to 10°. As used herein, the term "about" when referring to an angle means ±10% from the stated amount.

In configurations for sighted users, variation along the horizontal axis may slide three-dimensional objects, such as characters, Bitmojis, application icons, etc. in and out of the field of view by, for example, hiding, unhiding, or otherwise adjusting visibility of the three-dimensional object. Variation along the vertical axis, for example, when the user looks upwards, in one example, may display weather information, time of day, date, calendar appointments, etc. In another example, when the user looks downwards on the vertical axis, the eyewear device 100 may power down.

The right temple portion 110B includes temple body 211 and a temple cap that covers the exposed electronics elements shown in FIG. 1B, with the temple cap omitted in the cross-section of FIG. 1B. Disposed inside the right temple portion 110B are various interconnected circuit boards, such as PCBs or flexible PCBs, that include controller circuits for right visible light camera 114B, microphone(s) 130, speaker(s) 132, low-power wireless circuitry (e.g., for wireless short-range network communication via BLUETOOTH®), and high-speed wireless circuitry (e.g., for wireless local area network communication via WI-FI®).

The right visible light camera 114B may be coupled to or disposed on the flexible PCB 240 and covered by a visible light camera cover lens, which is aimed through opening(s) formed in the right temple portion 110B. In some examples, the frame 105 connected to the right temple portion 110B includes the opening(s) for the visible light camera cover lens. The frame 105 includes a front-facing side configured to face outwards away from the eye of the user. The opening for the visible light camera cover lens is formed on and through the front-facing side. In the example, the right visible light camera 114B has an outwards facing angle of coverage 111B with a line of sight or perspective of the right eye of the user of the eyewear device 100. The visible light camera cover lens can also be adhered to an outwards facing surface of the right temple portion 110B in which an opening is formed with an outwards facing angle of coverage, but in a different outwards direction. The coupling can also be indirect via intervening components.

Left (first) visible light camera 114A is connected to the left see-through image display 180C of left optical assembly 180A to generate a first background scene of a first successive displayed image. The right (second) visible light camera 114B is connected to the right see-through image display 180D of right optical assembly 180B to generate a second background scene of a second successive displayed image. The first background scene and the second background scene partially overlap to present a three-dimensional observable area of the successive displayed image.

Flexible PCB 140 is disposed inside the right temple portion 110B and is coupled to one or more other components housed in the right temple portion 110B. Although shown as being formed on the circuit boards of the right temple portion 110B, the right visible light camera 114B can be formed on the circuit boards of the left temple portion 110A, the temples 125A-B, or frame 105.

FIG. 2A is a rear view of an example hardware configuration of an eyewear device 100, which includes an eye scanner 113 on a frame 105, for use in a system for determining an eye position and gaze direction of a wearer/user of the eyewear device 100. As shown in FIG. 2A, the eyewear device 100 is in a form configured for wearing by a user, which are eyeglasses in the example of FIG. 2A. The eyewear device 100 can take other forms and may incorporate other types of frameworks, for example, a headgear, a headset, or a helmet.

In the eyeglasses example, eyewear device 100 includes the frame 105 which includes the left rim 107A connected to the right rim 107B via the bridge 106 adapted for a nose of the user. The left and right rims 107A-B include respective apertures 175A-B which hold the respective optical elements 180A-B, such as a lens and the see-through displays 180C-D. As used herein, the term lens is meant to cover transparent or translucent pieces of glass or plastic having curved and flat surfaces that cause light to converge/diverge or that cause little or no convergence/divergence.

Although shown as having two optical elements 180A-B, the eyewear device 100 can include other arrangements, such as a single optical element depending on the application or intended user of the eyewear device 100. As further shown, eyewear device 100 includes the left temple portion 110A adjacent the left lateral side 170A of the frame 105 and the right temple portion 110B adjacent the right lateral side 170B of the frame 105. The temple portions 110A-B may be integrated into the frame 105 on the respective sides 170A-B (as illustrated) or implemented as separate components attached to the frame 105 on the respective sides 170A-B. Alternatively, the temple portions 110A-B may be integrated into the temples 125A-B or other pieces (not shown) attached to the frame 105.

In the example of FIG. 2A, the eye scanner 113 includes an infrared emitter 115 and an infrared camera 120. Visible light cameras typically include a blue light filter to block infrared light detection. In an example, the infrared camera 120 may be a visible light camera, such as a low-resolution video graphic array (VGA) camera (e.g., 640×480 pixels for a total of 0.3 megapixels), with the blue filter removed. In the illustrated example, the infrared emitter 115 and the infrared camera 120 are co-located on the frame 105, for example, both are shown as connected to the upper portion of the left rim 107A. The frame 105 or one or more of the left and right temple portions 110A-B also may include a circuit board (not shown) that may include at least one of the infrared emitter 115 or the infrared camera 120. The infrared emitter 115 and the infrared camera 120 can be connected to the circuit board by soldering, for example.

Other arrangements of the infrared emitter 115 and infrared camera 120 can be implemented, including arrangements in which the infrared emitter 115 and infrared camera 120 are both on the right rim 107B, or in different locations on the frame 105. For example, the infrared emitter 115 may be on the left rim 107A and the infrared camera 120 on the right rim 107B. In another example, the infrared emitter 115 may be on the frame 105 and the infrared camera 120 on one of the temple portions 110A-B, or vice versa. The infrared emitter 115 can be connected essentially anywhere on the frame 105, left temple portion 110A, or right temple portion 110B to emit a pattern of infrared light. Similarly, the infrared camera 120 can be connected essentially anywhere on the frame 105, left temple portion 110A, or right temple portion 110B to capture at least one reflection variation in the emitted pattern of infrared light.

The infrared emitter 115 and infrared camera 120 are arranged to face inwards towards an eye of the user with a partial or full field of view of the eye in order to identify the respective eye position and gaze direction. For example, the infrared emitter 115 and infrared camera 120 may be positioned directly in front of the eye, in the upper part of the frame 105 or in the temple portions 110A-B at either ends of the frame 105.

FIG. 2B is a rear view of an example hardware configuration of another eyewear device 200. In this example configuration, the eyewear device 200 is depicted as including an eye scanner 213 on a right temple 210B. As shown, an infrared emitter 215 and an infrared camera 220 are co-located on the right temple 210B. It should be understood that the eye scanner 213 or one or more components of the eye scanner 213 can be located on the left temple 210A and other locations of the eyewear device 200, for example, the frame 105. The infrared emitter 215 and infrared camera 220 are like that of FIG. 2A, but the eye scanner 213 can be varied to be sensitive to different light wavelengths as described previously in FIG. 2A.

Similar to FIG. 2A, the eyewear device 200 includes a frame 105 which includes a left rim 107A which is connected to a right rim 107B via a bridge 106. The left and right rims 107A-B include respective apertures which hold the respective optical elements 180A-B comprising the see-through display 180C-D.

Figure 2C:
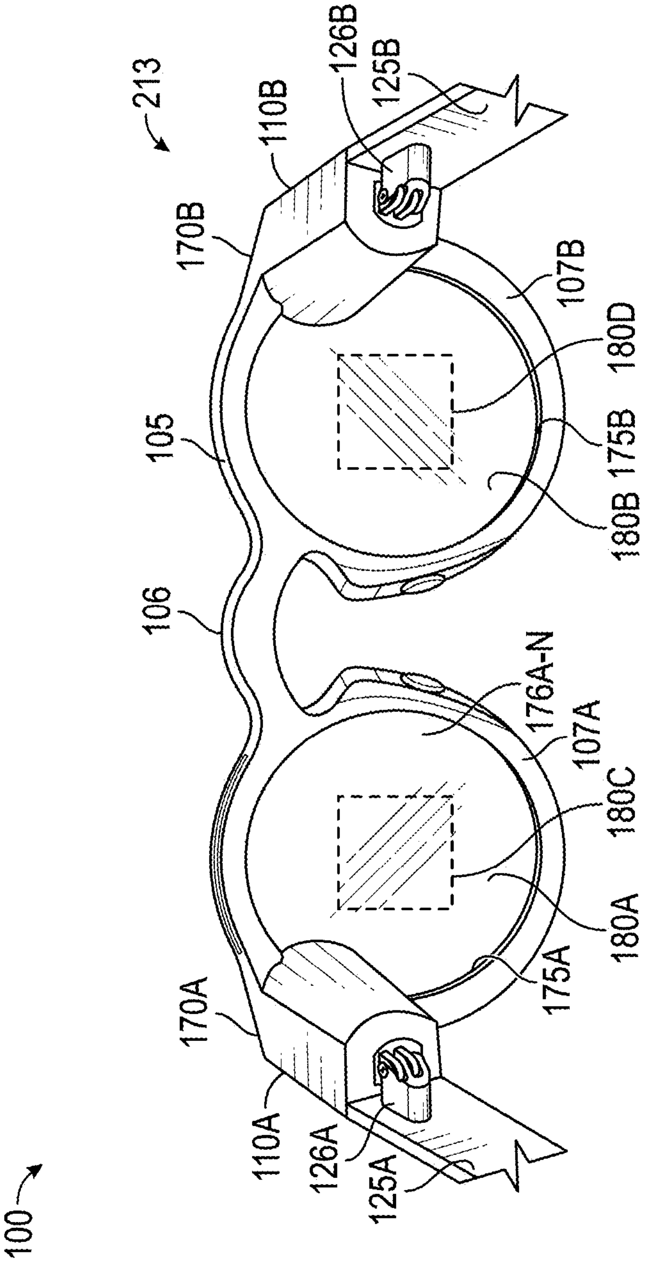
FIGS. 2C and 2D are rear views of example hardware configurations of the eyewear device, including two different types of image displays.
Figure 2D:
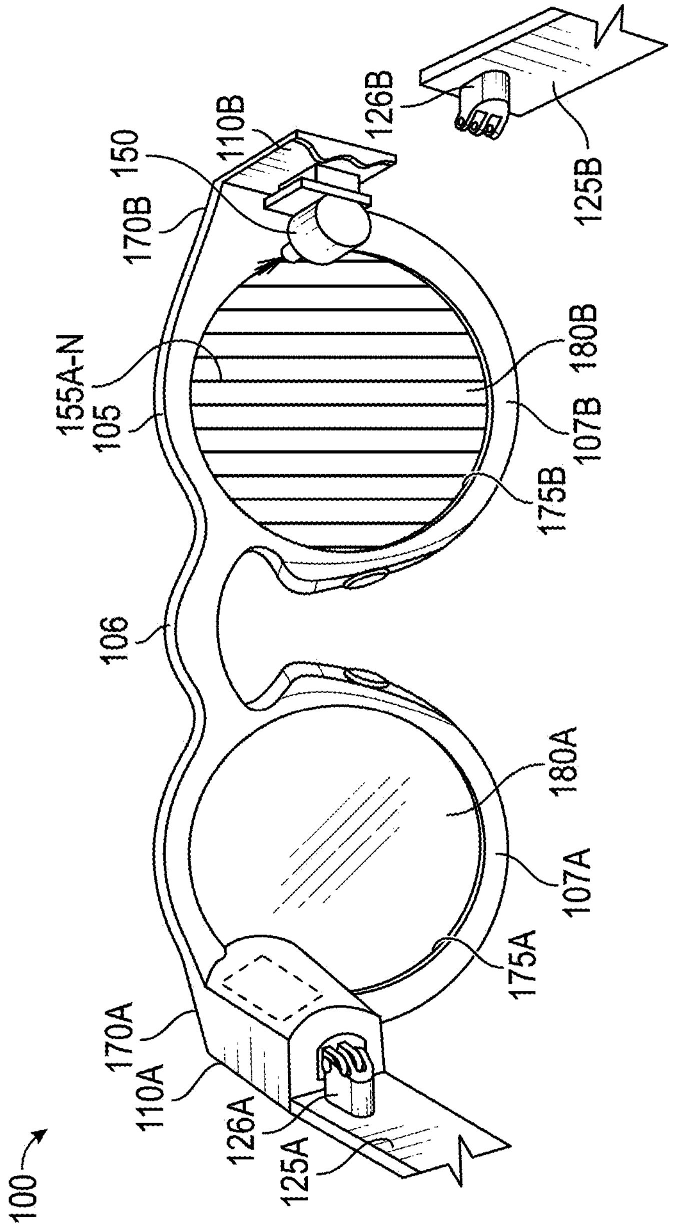

FIGS. 2C-D are rear views of example hardware configurations of the eyewear device 100, including two different types of see-through image displays 180C-D. In one example, these see-through image displays 180C-D of optical assembly 180A-B include an integrated image display. As shown in FIG. 2C, the optical assemblies 180A-B include a suitable display matrix 180C-D of any suitable type, such as a liquid crystal display (LCD), an organic light-emitting diode (OLED) display, a waveguide display, or any other such display. The optical assembly 180A-B also may include one or more optical layers 176, which can include lenses, optical coatings, prisms, mirrors, waveguides, optical strips, and other optical components in any combination. The optical layers 176A-N can include a prism having a suitable size and configuration and including a first surface for receiving light from display matrix and a second surface for emitting light to the eye of the user. The prism of the optical layers 176A-N extends over all or at least a portion of the respective apertures 175A-B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism is sized and shaped so that the light is refracted within the prism and is directed towards the eye of the user by the second surface of the prism of the optical layers 176A-N. In this regard, the second surface of the prism of the optical layers 176A-N can be convex to direct the light towards the center of the eye. The prism can optionally be sized and shaped to magnify the image projected by the see-through image displays 180C-D, and the light travels through the prism so that the image viewed from the second surface is larger in one or more dimensions than the image emitted from the see-through image displays 180C-D.

In another example, the see-through image displays 180C-D of optical assembly 180A-B include a projection image display as shown in FIG. 2D. The optical assembly 180A-B includes a laser projector 150, which is a three-color laser projector using a scanning mirror or galvanometer. During operation, an optical source such as a laser projector 150 is disposed in or on one of the temples 125A-B of the eyewear device 100. Optical assembly 180A-B also may include one or more optical strips 155A-N spaced apart across the width of the lens of the optical assembly 180A-B or across a depth of the lens between the front surface and the rear surface of the lens.

As the photons projected by the laser projector 150 travel across the lens of the optical assembly 180A-B, the photons encounter the optical strips 155A-N. When a particular photon encounters a particular optical strip, the photon is either redirected towards the user's eye, or it passes to the next optical strip. A combination of modulation of laser projector 150 and modulation of the optical strips 155A-N may control specific photons or beams of light. In an example, a processor controls optical strips 155A-N by initiating mechanical, acoustic, or electromagnetic signals. Although shown as having two optical assemblies 180A-B, the eyewear device 100 can include other arrangements, such as a single or three optical assemblies, or the optical assembly 180A-B may have arranged different arrangement depending on the application or intended user of the eyewear device 100.

As further shown in FIGS. 2C-D, eyewear device 100 includes a left temple portion 110A adjacent the left lateral side 170A of the frame 105 and a right temple portion 110B adjacent the right lateral side 170B of the frame 105. The temple portions 110A-B may be integrated into the frame 105 on the respective lateral sides 170A-B (as illustrated) or implemented as separate components attached to the frame 105 on the respective sides 170A-B. Alternatively, the temple portions 110A-B may be integrated into temples 125A-B attached to the frame 105.

In one example, the see-through image displays include the first see-through image display 180C and the second see-through image display 180D. Eyewear device 100 includes first and second apertures 175A-B which hold the respective first and second optical assemblies 180A-B. The first optical assembly 180A may include the first see-through image display 180C (e.g., a display matrix of FIG. 2C or optical strips 155A-N and laser projector 150). The second optical assembly 180B may include the second see-through image display 180D (e.g., a display matrix of FIG. 2C or optical strips 155A-N and laser projector 150). The successive field of view of the successive displayed image includes an angle of view between about 15° to 30°, and more specifically 24°, measured horizontally, vertically, or diagonally. The successive displayed image having the successive field of view represents a combined three-dimensional observable area visible through stitching together of two displayed images presented on the first and second image displays.

As used herein, "an angle of view" describes the angular extent of the field of view associated with the displayed images presented on each of the left and right image displays 180C-D of optical assembly 180A-B. The "angle of coverage" describes the angle range that a lens of visible light cameras 114A-B or infrared cameras 120 or 220 can image. Typically, the image circle produced by a lens is large enough to cover the film or sensor completely, possibly including some vignetting (i.e., a reduction of an image's brightness or saturation toward the periphery compared to the image center). If the angle of coverage of the lens does not fill the sensor, the image circle will be visible, typically with strong vignetting toward the edge, and the effective angle of view will be limited to the angle of coverage. The "field of view" is intended to describe the field of observable area that the user of the eyewear device 100 can see through his or her eyes via the displayed images presented on the left and right image displays 180C-D of the optical assembly 180A-B. Image display 180C of optical assembly 180A-B can have a field of view with an angle of coverage between 15° to 30°, for example 24°, and have a resolution of 480×480 pixels.

Figure 3:
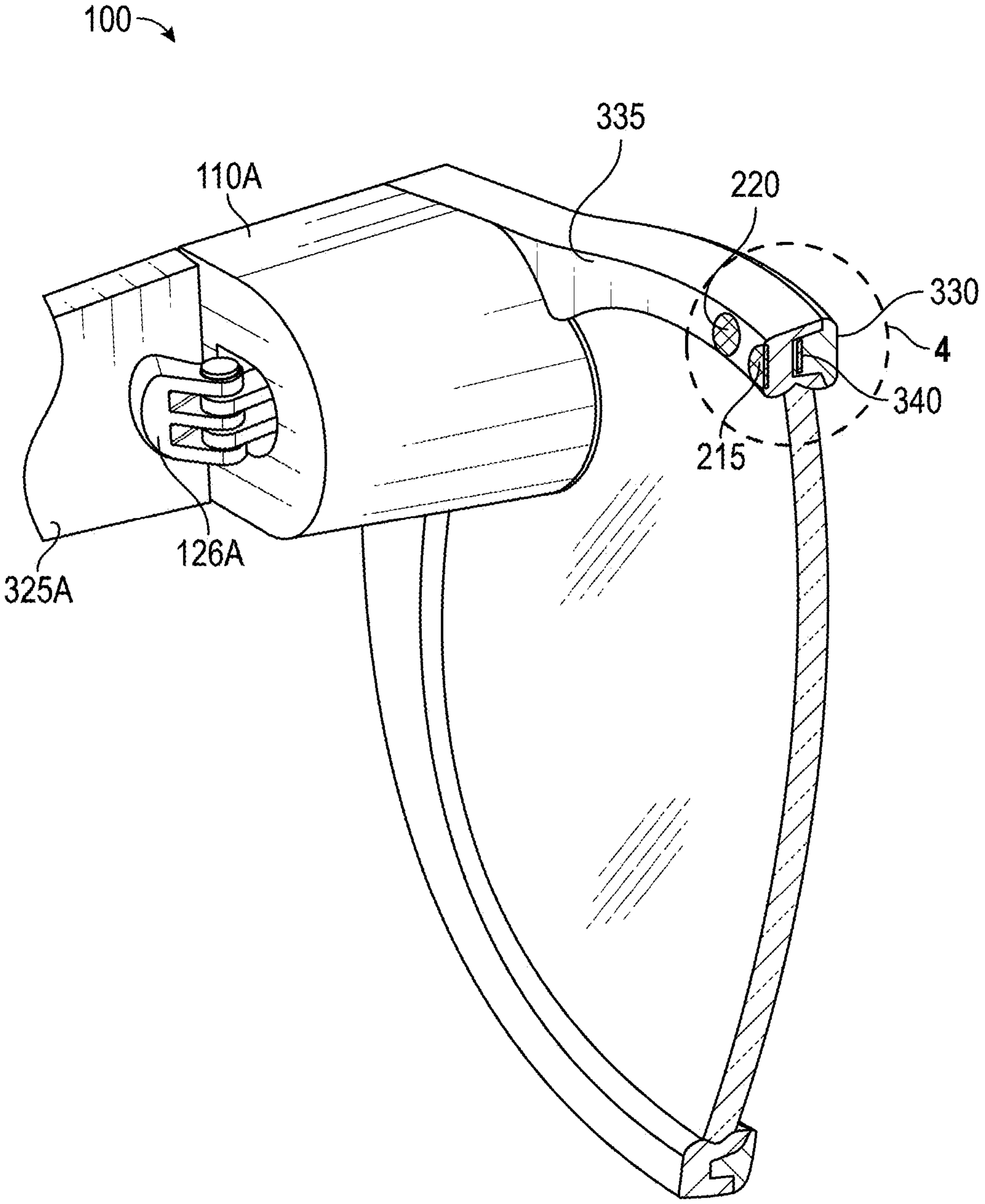
FIG. 3 shows a rear perspective view of the eyewear device of FIG. 2A depicting an infrared emitter, an infrared camera, a frame front, a frame back, and a circuit board.

FIG. 3 shows a rear perspective view of the eyewear device of FIG. 2A. The eyewear device 100 includes an infrared emitter 215, infrared camera 220, a frame front 330, a frame back 335, and a circuit board 340. It can be seen in FIG. 3 that the upper portion of the left rim of the frame of the eyewear device 100 includes the frame front 330 and the frame back 335. An opening for the infrared emitter 215 is formed on the frame back 335.

As shown in the encircled cross-section 4 in the upper middle portion of the left rim of the frame, a circuit board, which is a flexible PCB 340, is sandwiched between the frame front 330 and the frame back 335. Also shown in further detail is the attachment of the left temple portion 110A to the left temple 325A via the left hinge 126A. In some examples, components of the eye movement tracker 213, including the infrared emitter 215, the flexible PCB 340, or other electrical connectors or contacts may be located on the left temple 325A or the left hinge 126A.

Figure 4:
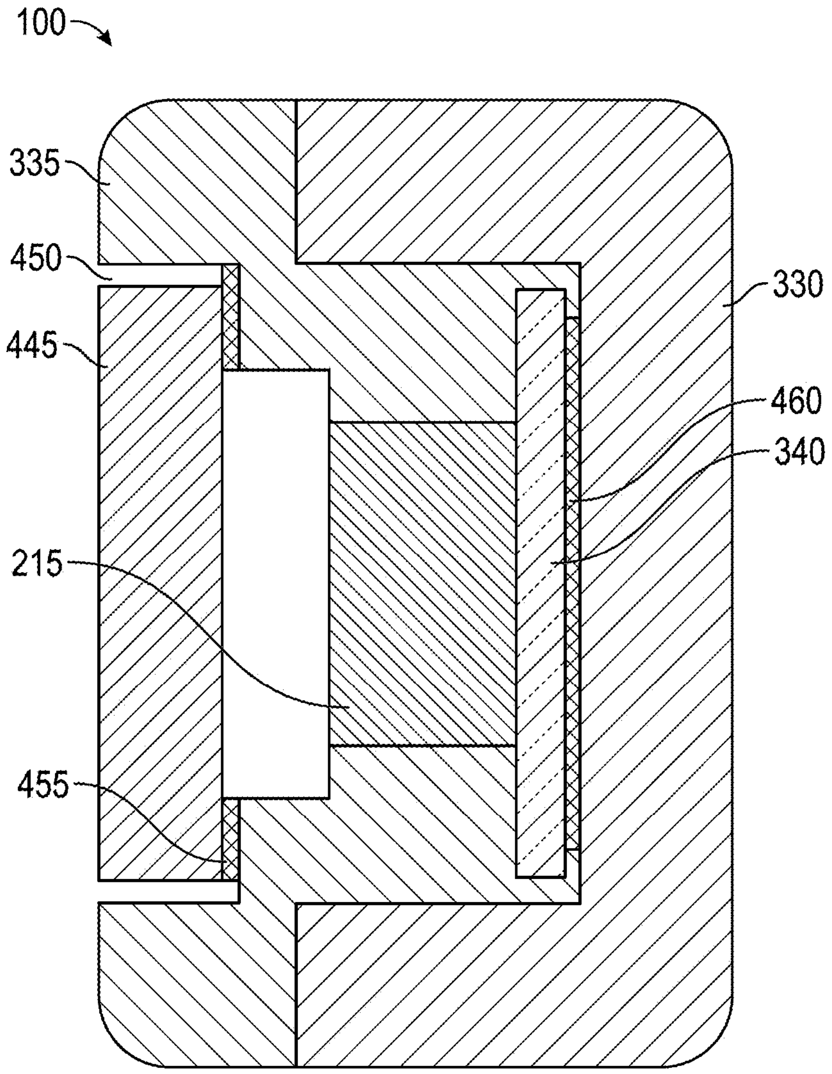
FIG. 4 is a cross-sectional view taken through the infrared emitter and the frame of the eyewear device of FIG. 3.

FIG. 4 is a cross-sectional view through the infrared emitter 215 and the frame corresponding to the encircled cross-section 4 of the eyewear device of FIG. 3. Multiple layers of the eyewear device 100 are illustrated in the cross-section of FIG. 4. As shown, the frame includes the frame front 330 and the frame back 335. The flexible PCB 340 is disposed on the frame front 330 and connected to the frame back 335. The infrared emitter 215 is disposed on the flexible PCB 340 and covered by an infrared emitter cover lens 445. For example, the infrared emitter 215 is reflowed to the back of the flexible PCB 340. Reflowing attaches the infrared emitter 215 to contact pad(s) formed on the back of the flexible PCB 340 by subjecting the flexible PCB 340 to controlled heat which melts a solder paste to connect the two components. In one example, reflowing is used to surface mount the infrared emitter 215 on the flexible PCB 340 and electrically connect the two components. However, it should be understood that through-holes can be used to connect leads from the infrared emitter 215 to the flexible PCB 340 via interconnects, for example.

The frame back 335 includes an infrared emitter opening 450 for the infrared emitter cover lens 445. The infrared emitter opening 450 is formed on a rear-facing side of the frame back 335 that is configured to face inwards towards the eye of the user. In the example, the flexible PCB 340 can be connected to the frame front 330 via the flexible PCB adhesive 460. The infrared emitter cover lens 445 can be connected to the frame back 335 via infrared emitter cover lens adhesive 455. The coupling can also be indirect via intervening components.

Figure 5:
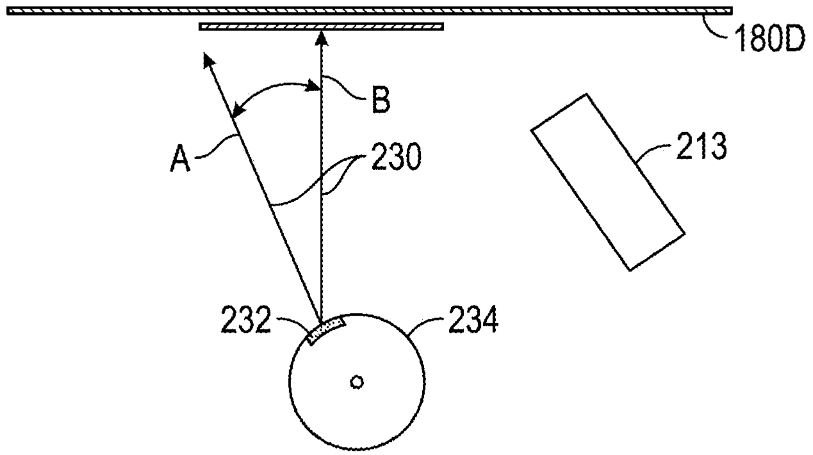
FIG. 5 illustrates detecting eye gaze direction.
Figure 6:
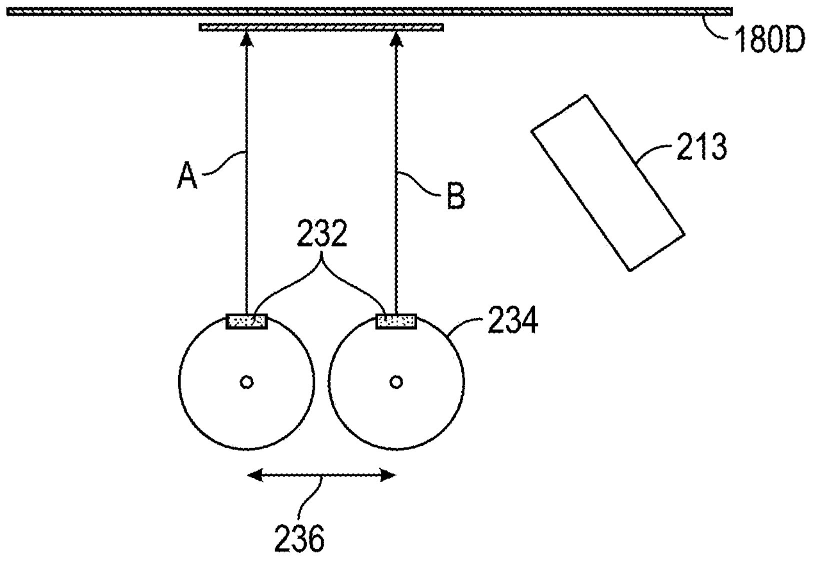
FIG. 6 illustrates detecting eye position.

In an example, the processor 932 utilizes eye tracker 213 to determine an eye gaze direction 230 of a wearer's eye 234 as shown in FIG. 5, and an eye position 236 of the wearer's eye 234 within an eyebox as shown in FIG. 6. The eye tracker 213 is a scanner which uses infrared light illumination (e.g., near-infrared, short-wavelength infrared, mid-wavelength infrared, long-wavelength infrared, or far infrared) to capture image of reflection variations of infrared light from the eye 234 to determine the gaze direction 230 of a pupil 232 of the eye 234, and also the eye position 236 with respect to the see-through display 180D.

Figure 7:
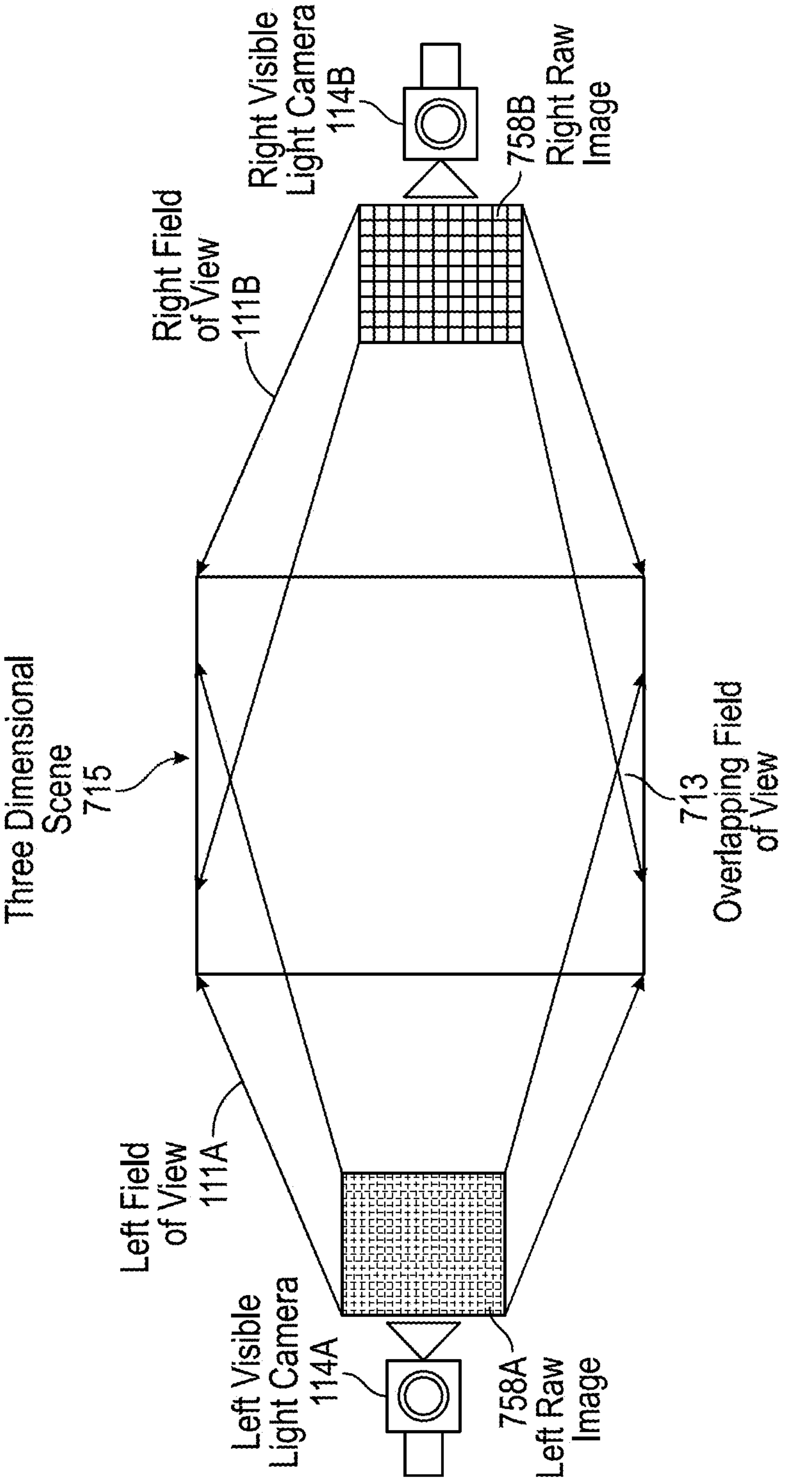
FIG. 7 depicts an example of visible light captured by the left visible light camera as a left raw image and visible light captured by the right visible light camera as a right raw image.

FIG. 7 depicts an example of capturing visible light with cameras within an overlapping field of view 713. Visible light is captured by the left visible light camera 114A with a left visible light camera field of view 111A as a left raw image 758A. Visible light is captured by the right visible light camera 114B with a right visible light camera field of view 111B as a right raw image 758B. Based on processing of the left raw image 758A and the right raw image 758B, a three-dimensional depth map 715 of a three-dimensional scene, referred to hereafter as an image, is generated by processor 932.

Figure 8A:
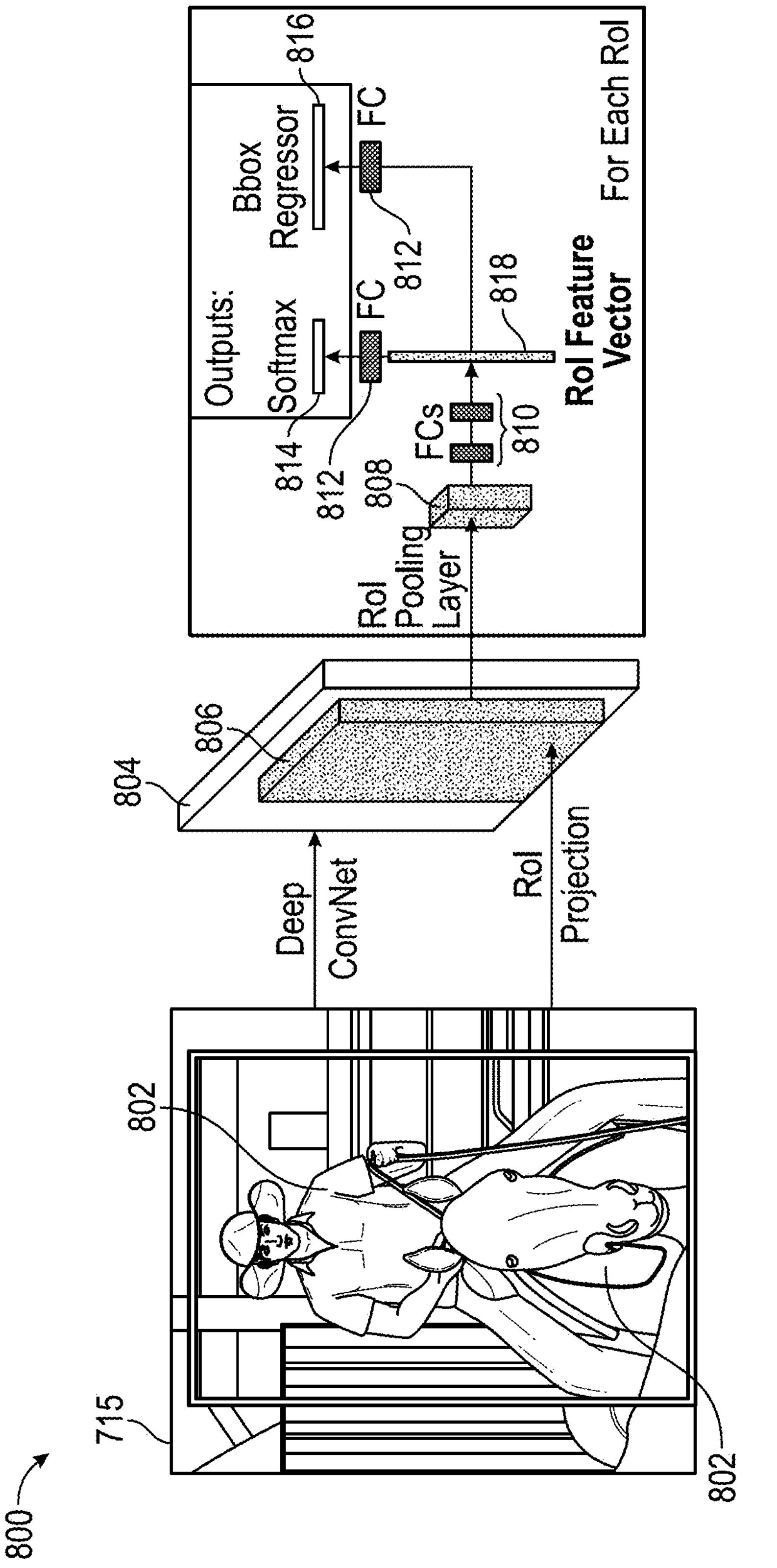
FIG. 8A illustrates the camera-based compensation system that identifies objects in an image, converts identified objects to text, and then converts the text to audio that is indicative of the identified objects in the image.
Figure 8B:
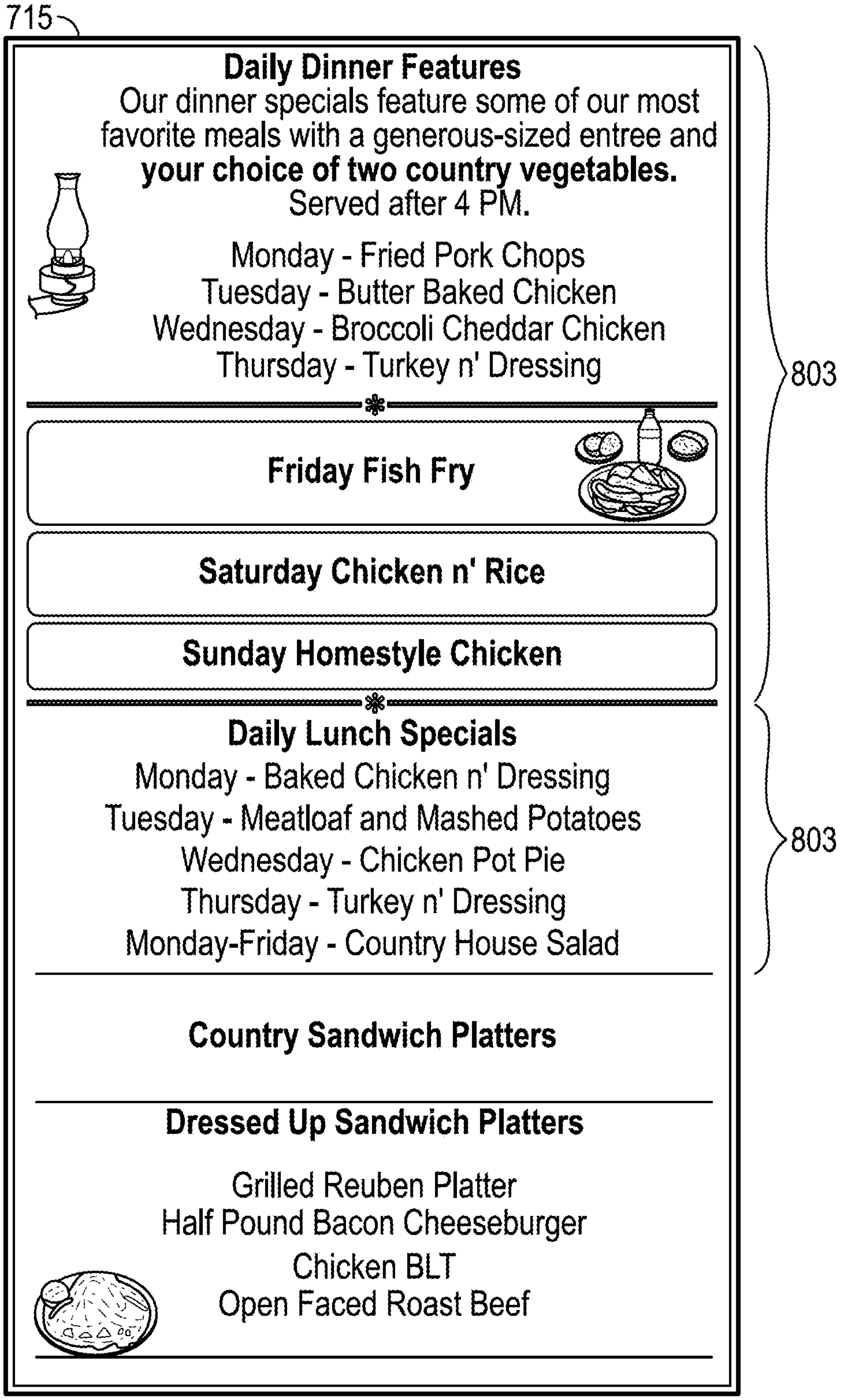
FIG. 8B illustrates an image, such as a restaurant menu, with sections that can be instructed via speech to be processed and read aloud to a user.
Figure 8C:
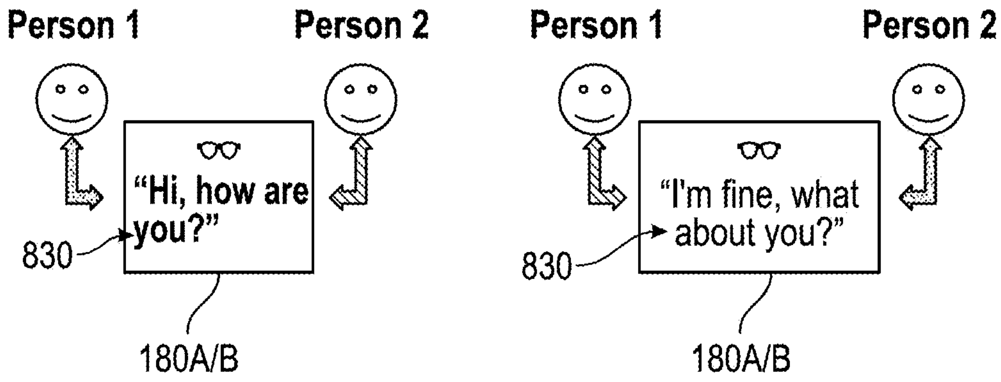
FIG. 8C illustrates eyewear providing diarization.

FIG. 8A illustrates an example of a camera-based system 800 processing a three-dimensional image 715 to improve the user experience of users of eyewear 100/200 having partial or total blindness (FIG. 8A, FIG. 8B and FIG. 8C). To compensate for partial or total blindness, the camera-based compensation 800 determines objects 802 in image 715, converts determined objects 802 to text, and then converts the text to audio that is indicative of the objects 802 in the image.

FIG. 8B is an image used to illustrate an example of a camera-based compensation system 800 responding to speech of a user, such as instructions, to improve the user experience of users of eyewear 100/200 having partial or total blindness. To compensate for partial or total blindness, the camera-based compensation 800 processes speech, such as instructions, received from a user/wearer of eyewear 100 to determine objects 803 in image 715, such as a restaurant menu, and converts determined objects 803 to audio that is indicative of the objects 803 in the image responsive to the speech command.

Figure 9:
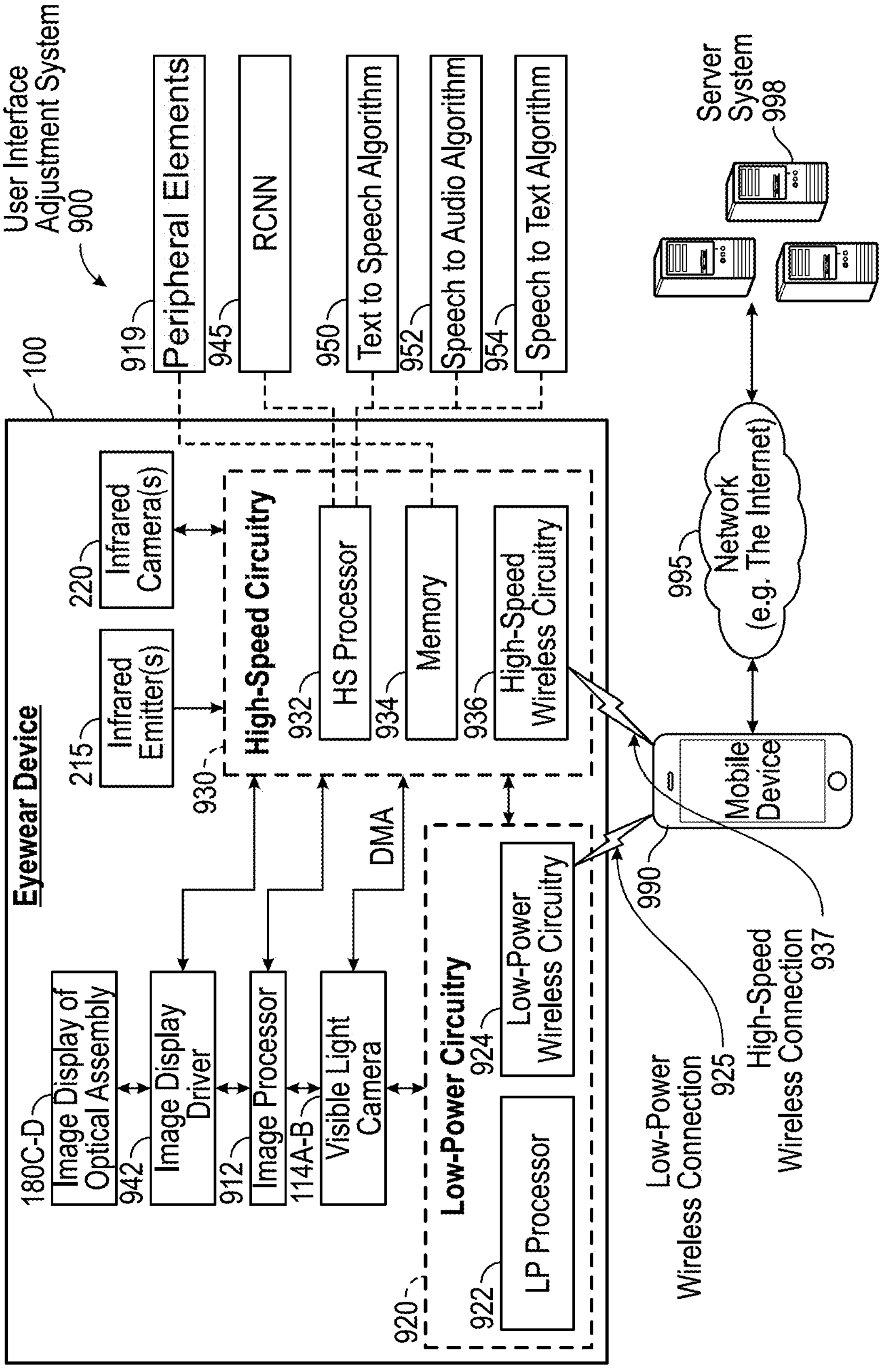
FIG. 9 illustrates a block diagram of electronic components of the eyewear device.

A convolutional neural network (CNN) is a special type of feed-forward artificial neural network that is generally used for image detection tasks. In an example, the camera-based compensation system 800 uses a region-based convolutional neural network (RCNN) 945 (FIG. 9). The RCNN 945 is configured to generate a convolutional feature map 804 that is indicative of objects 802 (FIG. 8A) and 803 (FIG. 8B) in the image 715 produced by the left and right cameras 114A-B. In one example, relevant text of the convolutional feature map 804 is processed by a processor 932 using a text to speech algorithm 950 (FIG. 9). In a second example, images of the convolutional feature map 804 are processed by processor 932 using a speech to audio algorithm 952 (FIG. 9) to produce audio that is indicative of objects in the image based on the speech instructions. The processor 932 may include a natural language processor configured to generate audio indicative of the objects 802 and 803 in the image 715.

In an example, and as will be discussed in further detail with respect to FIG. 10 below, image 715 generated from the left and right cameras 114A-B, respectively, is shown to include objects 802, seen in this example as a cowboy on a horse in FIG. 8A. The image 715 is input to the RCNN 945 which generates the convolutional feature map 804 based on the image 715. An example RCNN 945 is available from Analytics Vidhya of Gurugram, Haryana, India. From the convolutional feature map 804, the processor 932 identifies a region of proposals in the convolutional feature map 804 and transforms them into squares 806. The squares 806 represent a subset of the image 715 that is less than the whole image 715, where the square 806 shown in this example includes the cowboy on the horse. The region of proposal may be, for example, recognized objects (e.g., a human/cowboy, a horse, etc.) that are moving.

In another example, with reference to FIG. 8B, a user provides speech that is input to eyewear 100/200 using microphone 130 (FIG. 1B) to request certain objects 803 in image 715 to be read aloud via speaker 132. In an example, the user may provide speech to request a portion of a restaurant menu to be read aloud, such as daily dinner features, and daily specials. The RCNN 945 determines portions of the image 715, such as a menu, to identify objects 803 that correspond to the speech request. The processor 932 includes a natural language processor configured to generate audio indicative of the determine objects 803 in the image 715. The processor may additionally track head/eye movement to identify features such as a menu held in the hand of a wearer or a subset of the menu (e.g., the right or left side).

The processor 932 uses a region of interest (ROI) pooling layer 808 to reshape the squares 806 into a uniform size so that they can be input into one or more fully connected layers 810. A softmax layer 814 is used to predict the class of the proposed ROI based on a fully connected layer 812 and also offset values for a bounding box (bbox) regressor 816 from a ROI feature vector 818.

The relevant text of the convolutional feature map 804 is processed through the text to speech algorithm 950 using the natural language processor 932 and a digital signal processor is used to generate audio that is indicative of the text in the convolutional feature map 804. Relevant text may be text identifying moving objects (e.g., the cowboy and the horse; FIG. 8A) or text of a menu matching a user's request (e.g., list of daily specials; FIG. 8B). An example text to speech algorithm 950 is available from DFKI Berlin of Berlin, Germany. Audio can be interpreted using a convolutional neural network, or it may be offloaded to another device or system. The audio is generated using the speaker 132 such that it is audible to the user (FIG. 2A).

In another example, with reference to FIG. 8C, the eyewear 100/200 provides speaker segmentation, referred to as diarization. Diarization is a software technique that segments spoken language into different speakers and remembers that speaker over the course of a session. The RCNN 945 performs the diarization and identifies different speakers that are speaking in proximity to the eyewear 100/200 and indicates who they are by rendering output text differently on the eyewear display 180A and 180B. In an example, the processor 932 uses a speech to text algorithm 954 (FIG. 9) to process the text generated by the RCNN 945 and to display the text on displays 180A and 180B. The microphone 130 shown in FIG. 2A captures the speech of one or more human speakers in proximity to the eyewear 100/200. In the context of eyewear 100/200 and speech recognition, information 830 displayed on one or both displays 180A and 180B indicates the text transcribed from the speech and includes the information relative to the person speaking such that the eyewear user can distinguish the transcribed text of multiple speakers. The text 830 of each user has a different attribute such that the eyewear user can distinguish the text 830 of different speakers. FIG. 8C shows an example diarization in the captioning user experience (UX), where the attribute is a color randomly assigned to the displayed text whenever a new speaker is detected. For instance, the displayed text associated with person 1 is displayed in blue, and the displayed text associated with person 2 is displayed in green. In other examples, the attribute is a font type or font size of the displayed text 830 associated with each person. The location the text 830 displayed on the displays 180A and 180B is chosen such that vision of the eyewear user through the display 180A and 180B is not substantially obstructed.

FIG. 9 depicts a high-level functional block diagram including example electronic components disposed in eyewear 100/200. The illustrated electronic components include the processor 932, which executes the RCNN 945, the text to speech algorithm 950, the speech to audio algorithm 952, and the speech to text algorithm 954. The algorithms 950, 952, and 954 are a set of algorithms individually selectable by a user of the eyewear 100/200, and executable by the processor 932. The algorithms can be executed one a time, or simultaneously.

Memory 934 includes instructions including computer readable code for execution by electronic processor 932 to implement functionality of eyewear 100/200, including instructions (code) for processor 932 to perform RCNN 945, the text to speech algorithm 950, the speech to audio algorithm 952, and the speech to text algorithm 954.

Processor 932 receives power from battery (not shown) and executes the instructions stored in memory 934, or integrated with the processor 932 on-chip, to perform functionality of eyewear 100/200, and communicating with external devices via wireless connections.

A user interface adjustment system 900 includes a wearable device, such as the eyewear device 100 with an eye movement tracker 213 (e.g., shown as infrared emitter 215 and infrared camera 220 in FIG. 2B). User interface adjustment system 900 also includes a mobile device 990 and a server system 998 connected via various networks. Mobile device 990 may be a smartphone, tablet, laptop computer, access point, or any other such device capable of connecting with eyewear device 100 using both a low-power wireless connection 925 and a high-speed wireless connection 937. Mobile device 990 is connected to server system 998 and network 995. The network 995 may include any combination of wired and wireless connections.

Eyewear device 100 may include at least two visible light cameras 114A-B (one associated with the left lateral side 170A and one associated with the right lateral side 170B) that provide streams of data to the high-speed circuitry 930 via direct memory access (DMA), for example. Eyewear device 100 may further include two see-through image displays 180C-D of the optical assembly 180A-B (one associated with the left lateral side 170A and one associated with the right lateral side 170B). The image displays 180C-D are optional in this disclosure. Eyewear device 100 also may include image display driver 942, image processor 912, low-power circuitry 920, and high-speed circuitry 930. The components shown in FIG. 9 for the eyewear device 100 are located on one or more circuit boards, for example a PCB or flexible PCB, in the temples. Alternatively, or additionally, the depicted components can be located in the temples, frames, hinges, or bridge of the eyewear device 100. Left and right visible light cameras 114A-B can include digital camera elements such as a complementary metal-oxide-semiconductor (CMOS) image sensor, charge coupled device, a lens, or any other respective visible or light capturing elements that may be used to capture data, including images of scenes with unknown objects.

Eye movement tracking programming 945 implements the user interface field of view adjustment instructions, including causing the eyewear device 100 to track, via the eye movement tracker 213, the eye movement of the eye of the user of the eyewear device 100. Other implemented instructions (functions) cause the eyewear device 100 to determine a field of view adjustment to the initial field of view of an initial displayed image based on the detected eye movement of the user corresponding to a successive eye direction. Further implemented instructions generate a successive displayed image of the sequence of displayed images based on the field of view adjustment. The successive displayed image is produced as visible output to the user via the user interface. This visible output appears on the see-through image displays 180C-D of optical assembly 180A-B, which is driven by image display driver 942 to present the sequence of displayed images, including the initial displayed image with the initial field of view and the successive displayed image with the successive field of view.

As shown in FIG. 9, high-speed circuitry 930 includes high-speed processor 932, memory 934, and high-speed wireless circuitry 936. In the example, the image display driver 942 is coupled to the high-speed circuitry 930 and operated by the high-speed processor 932 in order to drive the left and right image displays 180C-D of the optical assembly 180A-B. High-speed processor 932 may be any processor capable of managing high-speed communications and operation of any general computing system needed for eyewear device 100. High-speed processor 932 includes processing resources needed for managing high-speed data transfers on high-speed wireless connection 937 to a wireless local area network (WLAN) using high-speed wireless circuitry 936. In certain examples, the high-speed processor 932 executes an operating system such as a LINUX operating system or other such operating system of the eyewear device 100 and the operating system is stored in memory 934 for execution. In addition to any other responsibilities, the high-speed processor 932 executes a software architecture for the eyewear device 100 that is used to manage data transfers with high-speed wireless circuitry 936. In certain examples, high-speed wireless circuitry 936 is configured to implement Institute of Electrical and Electronic Engineers (IEEE) 802.11 communication standards, also referred to herein as WI-FI®. In other examples, other high-speed communications standards may be implemented by high-speed wireless circuitry 936.

Low-power wireless circuitry 924 and the high-speed wireless circuitry 936 of the eyewear device 100 can include short range transceivers (BLUETOOTH®) and wireless wide, local, or wide area network transceivers (e.g., cellular or WI-FI®). Mobile device 990, including the transceivers communicating via the low-power wireless connection 925 and high-speed wireless connection 937, may be implemented using details of the architecture of the eyewear device 100, as can other elements of network 995.

Memory 934 may include any storage device capable of storing various data and applications, including, among other things, color maps, camera data generated by the left and right visible light cameras 114A-B and the image processor 912, as well as images generated for display by the image display driver 942 on the see-through image displays 180C-D of the optical assembly 180A-B. While memory 934 is shown as integrated with high-speed circuitry 930, in other examples, memory 934 may be an independent standalone element of the eyewear device 100. In certain such examples, electrical routing lines may provide a connection through a chip that includes the high-speed processor 932 from the image processor 912 or low-power processor 922 to the memory 934. In other examples, the high-speed processor 932 may manage addressing of memory 934 such that the low-power processor 922 will boot the high-speed processor 932 any time that a read or write operation involving memory 934 is needed.

Server system 998 may include one or more computing devices as part of a service or network computing system, for example, and may include a processor, a memory, and network communication interface to communicate over the network 995 with the eyewear device 100 via high-speed wireless circuitry 936, either directly, or via the mobile device 990. Eyewear device 100 may be connected with a host computer. In one example, the eyewear device 100 wirelessly communicates with the network 995 directly, without using the mobile device 990, such as using a cellular network or WI-FI®. In another example, the eyewear device 100 is paired with the mobile device 990 via the high-speed wireless connection 937 and connected to the server system 998 via the network 995.

Output components of the eyewear device 100 include visual components, such as the left and right image displays 180C-D of optical assembly 180A-B as described in FIGS. 2C-D (e.g., a display such as a liquid crystal display (LCD), a plasma display panel (PDP), a light emitting diode (LED) display, a projector, or a waveguide). The image displays 180C-D of the optical assembly 180A-B are driven by the image display driver 942. The output components of the eyewear device 100 may further include acoustic components (e.g., speakers), haptic components (e.g., a vibratory motor), other signal generators, and so forth. The input components of the eyewear device 100, the mobile device 990, and server system 998, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Eyewear device 100 may optionally include additional peripheral device elements 919. Such peripheral device elements may include biometric sensors, additional sensors, or display elements integrated with eyewear device 100. For example, peripheral device elements 919 may include any I/O components including output components, motion components, position components, or any other such elements described herein.

For example, the biometric components of the user interface field of view adjustment 900 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components may include acceleration sensor components (e.g., accelerometer), gravitation sensor components, rotation sensor components (e.g., gyroscope), and so forth. The position components may include location sensor components to generate location coordinates (e.g., a Global Positioning System (GPS) receiver component), WI-FI® or BLUETOOTH® transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 925 and 937 from the mobile device 990 via the low-power wireless circuitry 924 or high-speed wireless circuitry 936.

According to some examples, an "application" or "applications" are program(s) that execute functions defined in the programs. Various programming languages can be employed to generate one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third-party application can invoke API calls provided by the operating system to facilitate functionality described herein.

Figure 10:
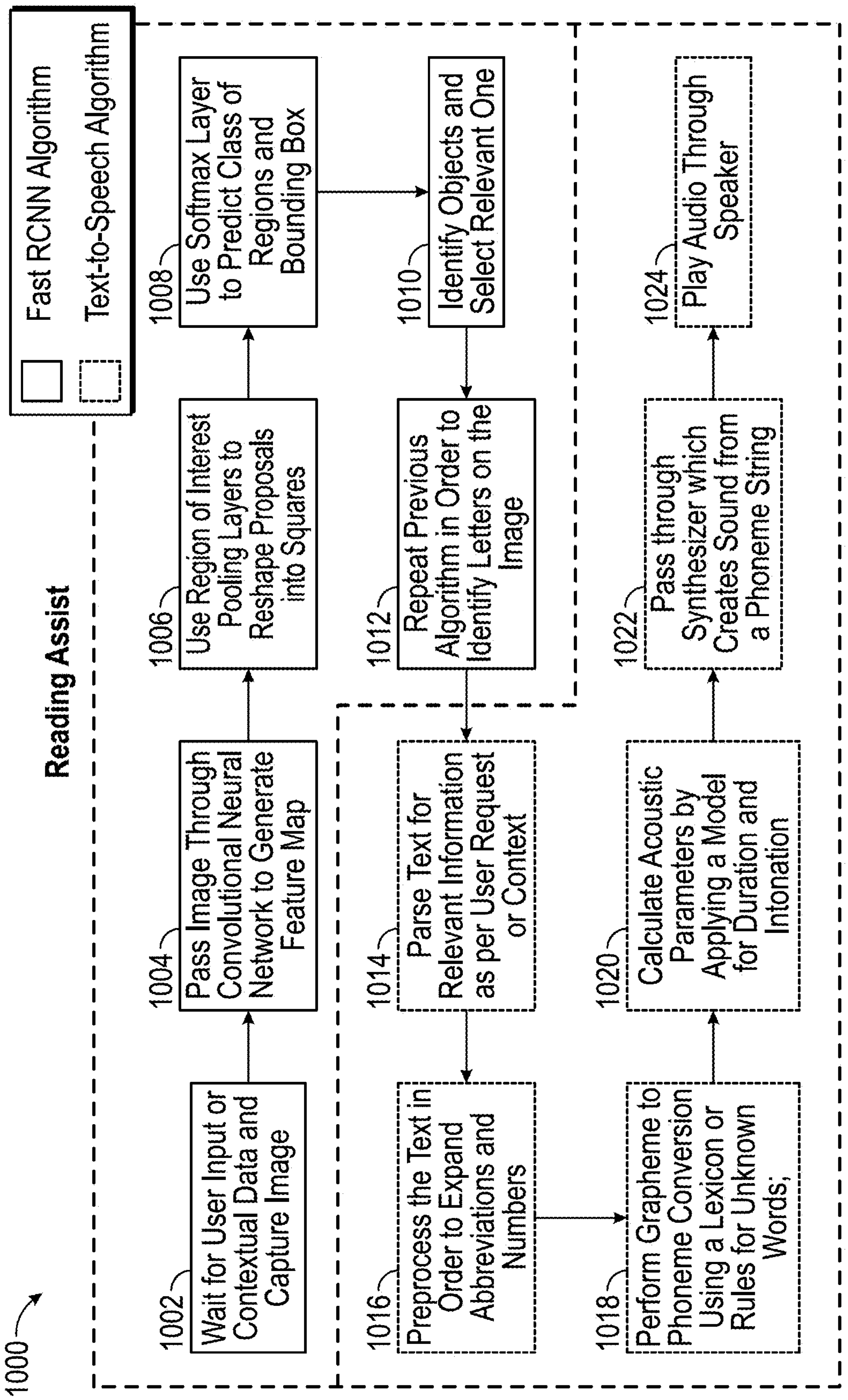
FIG. 10 is a flowchart of the operation of the eyewear device to identify objects in a scene.

FIG. 10 is a flowchart 1000 illustrating the operation of the eyewear device 100/200 and other components of the eyewear performed by the high-speed processor 932 executing instructions stored in memory 934 to identify objects in a scene. Although shown as occurring serially, the blocks of FIG. 10 may be reordered or parallelized depending on the implementation.

Blocks 1002-1012 may be performed using the RCCN 945.

At block 1002, the processor 932 waits for user input or contextual data and image capture. In a first example, the input is the image 715 generated from the left and right cameras 114A-B, respectively, and shown to include objects 802 shown in FIG. 8A as a cowboy on a horse in this example. In a second example, the input also includes speech from a user/wearer via microphone 130, such as verbal instructions to read an object 803 in an image 715 placed in front of the eyewear 100, shown in FIG. 8B. This can include speech to read a restaurant menu or portion thereof, such as the daily features.

At block 1004, the processor 932 passes image 715 through the RCCN 945 to generate the convolutional feature map 804. The processor 932 uses a convolutional layer using a filter matrix over an array of image pixels in image 715 and performs a convolutional operation to obtain the convolution feature map 804.

At block 1006, the processor 932 uses the ROI pooling layers 808 to reshape a region of proposals of the convolutional feature map 804 into squares 806. The processor is programmable to determine the shape and size of the squares 806 to determine how many objects are processed and to avoid information overload. ROI pooling layer 808 is an operation used in object detection tasks using convolutional neural networks. For example, to detect the cowboy 802 on the horse in a single image 715 shown in FIG. 8A in a first example, and to detect menu information 803 shown in FIG. 8B in a second example. The ROI pooling layer 808 purpose is to perform max pooling on inputs of nonuniform sizes to obtain fixed-size feature maps (e.g., 7×7 units).

At block 1008, the processor 932 processes the fully connected layers 810, where the softmax layer 814 uses fully connected layer 812 to predict the class of the proposed regions and the bounding box regressor 816. A softmax layer is typically the final output layer in a neural network that performs multi-class classification (for example: object recognition).

At block 1010, the processor 932 identifies objects 802 and 803 in the image 715 and selects relevant features such as objects 802 and 803. The processor 932 is programmable to identify and select different classes of objects 802 and 803 in the squares 806, for example, traffic lights of a roadway and the color of the traffic lights. In another example, the processor 932 is programmed to identify and select moving objects in square 806 such as vehicles, trains, and airplanes. In another example the processor is programmed to identify and select signs, such as pedestrian crossings, warning signs and informational signs. In the example shown in FIG. 8A, the processor 932 identifies the relevant objects 802 as the cowboy and the horse. In the example shown in FIG. 8B, the processor identifies the relevant objects 803 (e.g., based on user instructions) such as the menu portions, e.g., daily dinner specials and daily lunch specials.

At block 1012, blocks 1002-1010 are repeated in order to identify letters and text in the image 715. Processor 932 identifies the relevant letters and text. The relevant letters and text may be determined to be relevant, in one example, if they occupy a minimum portion of the image 715, such as 1/1000 of the image or greater. This limits the processing of smaller letters and text that are not of interest. The relevant objects, letters and text are referred to as features, and are all submitted to the text to speech algorithm 950.

Blocks 1014-1024 are performed by the text to speech algorithm 950 and speech to audio algorithm 952. Text to speech algorithm 950 and speech to audio algorithm 952 process the relevant objects 802 and 803, letters and texts received from the RCCN 945.

At block 1014, the processor 932 parses text of the image 715 for relevant information as per user request or context. The text is generated by the convolutional feature map 804.

At block 1016, the processor 932 preprocesses the text in order to expand abbreviations and numbers. This can include translating the abbreviations into text words, and numerals into text words.

At block 1018, the processor 932 performs grapheme to phoneme conversion using a lexicon or rules for unknown words. A grapheme is the smallest unit of a writing system of any given language. A phoneme is a speech sound in a given language.

At block 1020, the processor 932 calculates acoustic parameters by applying a model for duration and intonation. Duration is the amount of elapsed time between two events. Intonation is variation in spoken pitch when used, not for distinguishing words as sememes (a concept known as tone), but, rather, for a range of other functions such as indicating the attitudes and emotions of the speaker.

At block 1022, the processor 932 passes the acoustic parameters through a synthesizer to produce sounds from a phoneme string. The synthesizer is a software function executed by the processor 932.

At block 1024, the processor 932 plays audio through speaker 132 that is indicative of features including objects 802 and 803 in image 715, as well as letters and text. The audio can be one or more words having suitable duration and intonation. Audio sounds for words are prerecorded, stored in memory 934 and synthesized, such that any word can be played based on the distinct breakdown of the word. Intonation and duration can be stored in memory 934 as well for specific words in the case of synthesis.

Figure 11:
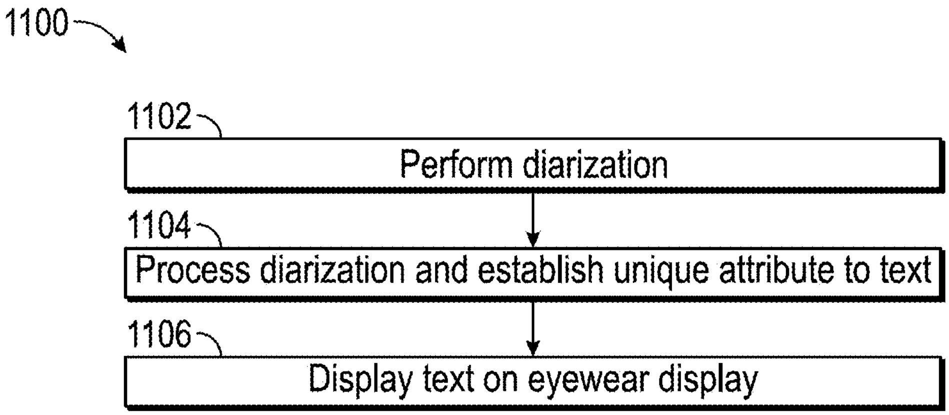
FIG. 11 is a flowchart illustrating the speech to text algorithm.

FIG. 11 is a flowchart 1100 illustrating the speech to text algorithm 954 executed by processor 932 to perform diarization of speech generated by multiple speakers and to display text associated with each speaker on the eyewear display 180A and 180B. Although shown as occurring serially, the blocks of FIG. 11 may be reordered or parallelized depending on the implementation.

At block 1102, the processor 932 uses RCNN 945 to perform diarization on spoken language of a plurality of speakers to obtain diarization information. The RCNN 945 performs diarization by segmenting the spoken language into different speakers (e.g., based on speech characteristics) and remembering the respective speaker over the course of a session. The RCNN 945 converts each segment of the spoken language to respective text 830 such that one portion of text 830 represents the speech of one speaker, and a second portion of text 830 represents the speech of a second speaker, as shown in FIG. 8C. Other techniques for performing diarization include using diarization features available from a third-party provider such as Google, Inc. located in Mountain View, California. The diarization provides text associated with each speaker.

At block 1104, the processor 932 processes the diarization information received from the RCNN 945 and establishes a unique attribute to apply to the text 830 for each speaker. The attribute can take many forms, such as the text color, size, font. The attribute can also include enhanced UX such as user avatars/Bitmojis to go with the text 830. For example, a characteristically male voice will receive a blue color text attribute, a characteristically female voice will receive a pink color text attribute, and a characteristically angry voice (e.g., based on pitch and intonation) will receive a red color text attribute. Additionally, font size of the text 830 may be adjusted by increasing the font attribute based on a decibel level of the speech above a first threshold and decreasing the font attribute based on a decibel level of the speech below a second threshold.

At block 1106, the processor 932 displays the text 830 on one or both displays 180A and 180B, as shown in FIG. 8C. The text 830 can be displayed in different locations on the display 180A and 180B. The location is chosen such that vision of the user through the display 180A and 180B is not substantially obstructed.

Force Feedback for Precision Guidance

The smart glasses 100 described above may provide voice guidance such as reading the content of a page or guiding the user with voice. It is desired to enhance the capabilities of such devices to further provide cost-effective precision control to enable visually-impaired users to perform tasks such as picking up an object. In particular, smart glasses 100 may be used to scan the environment and to identify objects to the user of the AR device using the techniques described above. In a sample configuration, the smart glasses 100 may process real-time depth data and combine such data with hand gesture data recognized by the smart glasses using, for example, the techniques described in U.S. Provisional Patent Application Ser. No. 63/126,273, entitled "Eyewear Including Sign Language to Speech Translation," filed Dec. 16, 2020, the contents of which were incorporated by reference above. The resulting data may be used to provide users with the input needed to track/find objects and to guide the user to the objects.

Figure 12:
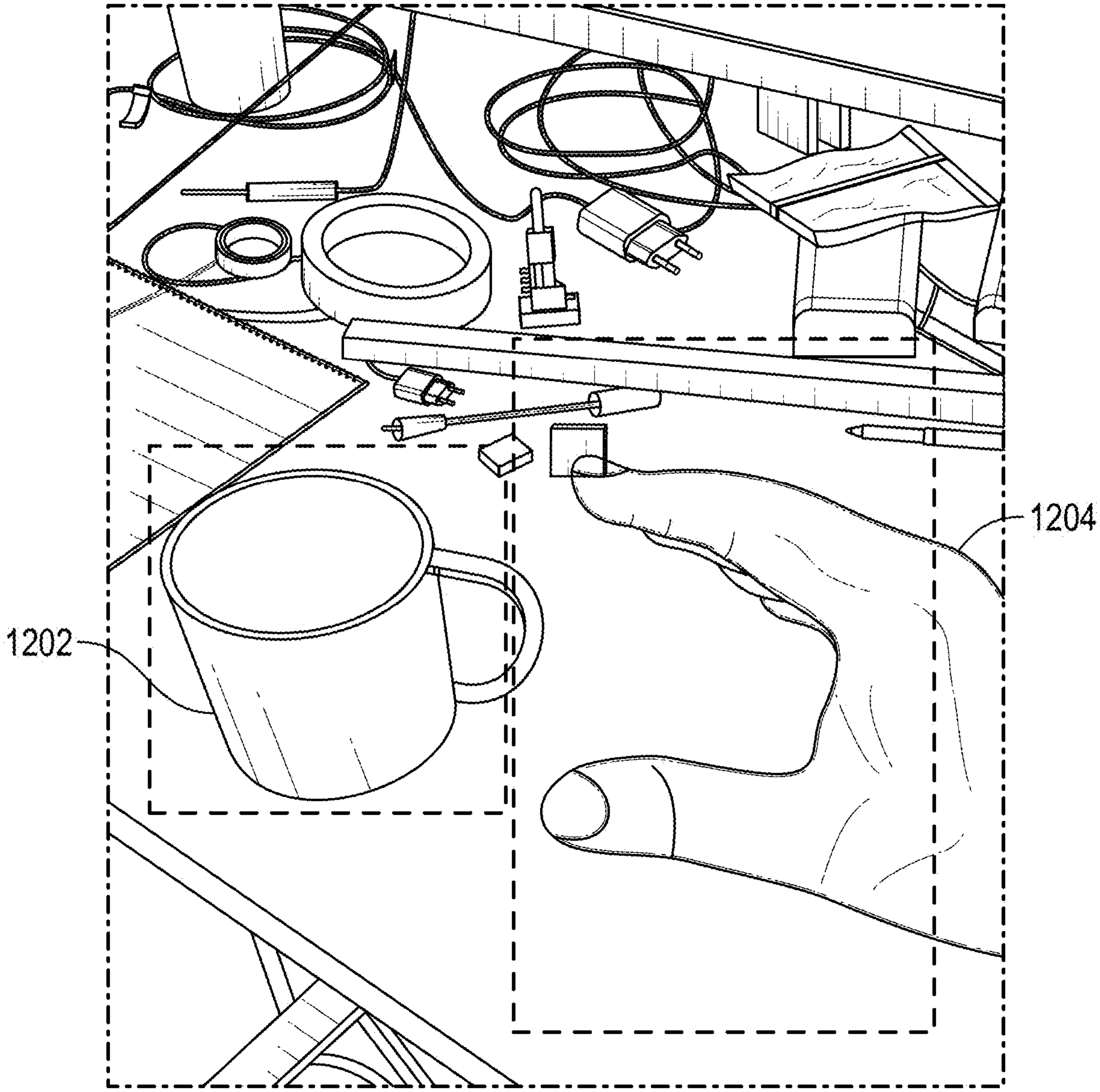
FIG. 12 illustrates the use of smart glasses to identify an object of interest, in this case a coffee mug.

Using the techniques described above, the smart glasses 100 may use object classification and tracking to find items such as a stop sign, a car key, a cup, a door, etc. For example, as illustrated in FIG. 12, the smart glasses 100 may use the object identification and classification techniques described above with respect to FIG. 10 to identify and track one or more stationary or moving objects of interest such as a coffee mug 1202 in the surrounding scene. A skeletal model of the user's hand 1204 may be similarly tracked by the smart glasses 100. The smart glasses 100 may provide navigation data to the user that may be communicated at least one of audibly or via feedback to the user's hand. As described further below, the smart glasses 100 may provide a command to a BLUETOOTH® module associated with haptic sensors or buzzers to provide one-way feedback to the hand 1204 of the user. (It is noted that two-way feedback is not needed as the hand 1204 is viewed and monitored by the smart glasses 100.) The feedback may be coarse (to the user's hand 1204 in general or a single finger) or granular (to respective joints on the user's hand 1204) for guiding the user's hand 1204 to the tracked object 1202.

Figure 13A:
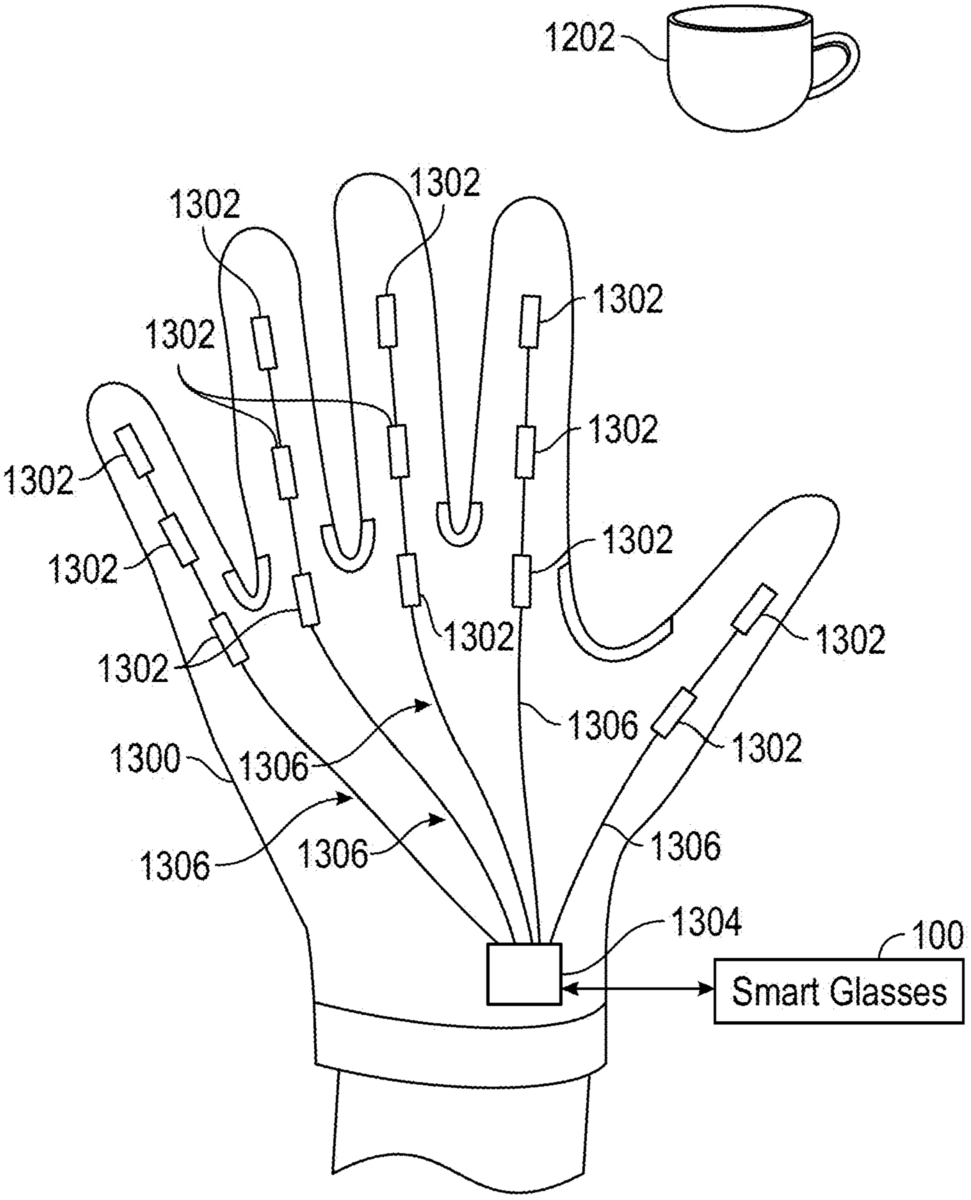
FIG. 13A illustrates a glove adapted to include buzzers that communicate with the smart glasses to selectively buzz to guide the user's hand to the identified object.

The type of feedback provided may be in any of a number of forms from a number of different devices. FIG. 13A illustrates a glove 1300 adapted to include buzzers 1302 at the respective finger joints that communicate with the smart glasses 100 to selectively buzz or vibrate to guide the user's hand to the identified object 1202. For example, the buzzers 1302 may comprise piezoelectric sensors or mini-vibration disc motors. In the example of FIG. 13A, the user may wear a glove 1300 with small buzzers 1302 at the hand joints that are connected to BLUETOOTH® low energy (BLE) module 1304 via wires 1306 for providing one way feedback to the user. For example, the smart glasses 100 may communicate with glove 1300 via a BLUETOOTH® low energy (BLE) communication module 1304 in the glove 1300. As illustrated, the glove 1300 may include small buzzers 1302 at the hand joints that receive control signals from the smart glasses 100 via the BLUETOOTH® module 1304 to selectively buzz (vibrate) or press the hand joint buzzers 1302 to precisely guide the user's gloved hand to the tracked object 1202. The respective control signals for the respective hand joint buzzers 1302 may be generated using a hand model that defines each of the geometric locations of the sensors for the smart glasses 100. The BLUETOOTH® module 1304 may receive and distribute the respective control signals according to the hand model. Alternatively, the buzzers 1302 may communicate with the BLUETOOTH® module 1304 via BLUETOOTH® communications. In such a case, the respective buzzers 1302 would be adapted to include BLUETOOTH® low energy (BLE) communication devices. In a sample configuration, precise control may be provided by the BLUETOOTH® module 1304 by adjusting at least one of the voltage or frequency of the signals applied to the buzzers 1302 up or down using, for example, pulse width modulation (PWM). The voltage or frequency may be derived from the approximate distance each hand joint node having a buzzer 1302 is from an edge or a center of the tracked object 1202 as determined by the processor 932 of the smart glasses 100.

Figure 13B:
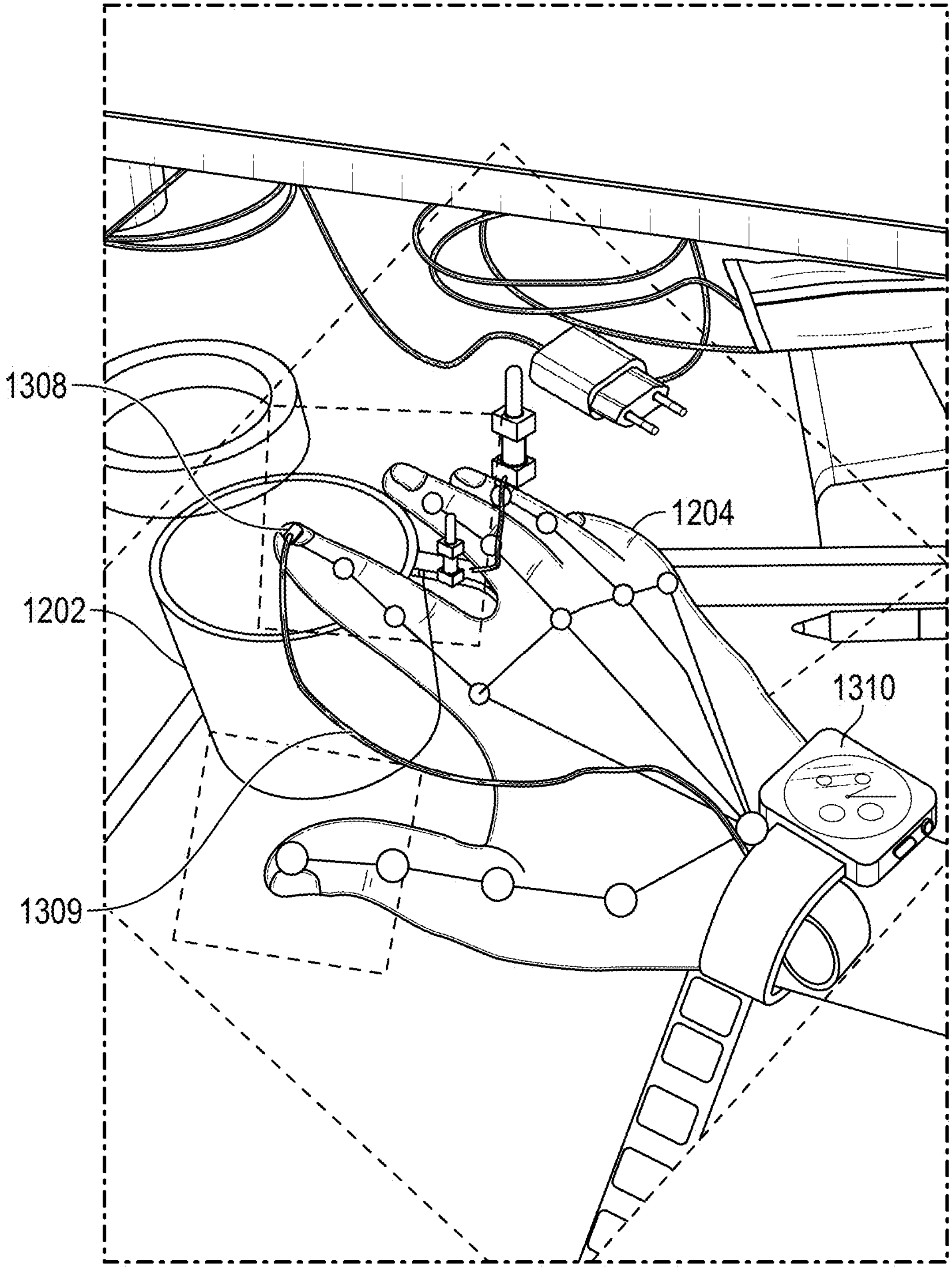
FIG. 13B illustrates another example where a single buzzer is provided at the tip of the user's pointer finger and is activated to guide the user's hand to the identified object.

FIG. 13B illustrates another example where a single buzzer 1308 at the tip of the user's pointer finger is activated to guide the user's hand to the identified object 1202. In this example, the buzzer 1308 is powered and controlled via a wired connection 1309 to a smart watch 1310 that receives control signals from the smart glasses 100. As in the example of FIG. 13A, the smart glasses 100 may communicate with the smart watch 1310 via BLUETOOTH®. Alternatively, the smart glasses 100 may communicate directly with the buzzer 1308 via a BLUETOOTH® low energy (BLE) communication device associated with (e.g., integrated into the fingertip structure with) buzzer 1308, or the smart watch 1310 may communicate with the buzzer 1308 via a BLUETOOTH® low energy (BLE) communication device associated with (e.g., integrated into the fingertip structure with) buzzer 1308. As in the example of FIG. 13A, precise control may be provided by adjusting the voltage of the buzzer 1308 up or down using, for example, pulse width modulation (PWM) where the voltage is derived from the approximate distance the fingertip buzzer 1308 (or in the case of FIG. 13A, each respective buzzer 1302) is from an edge or a center of the tracked object 1202. Those skilled in the art will further appreciate that multiple fingertip buzzers 1308 may be implemented for more precision.

In either of the embodiments, the tactile feedback may increase in at least one of frequency or force as the user's hand approaches the tracked object 1202 and decrease in at least one of frequency or force as the user's hand is moved farther away from the tracked object 1202. The vibration may stop once the user touches the tracked object 1202. The force may be adjusted by adjusting the voltage of the associated control signal.

In alternative configurations, the smart glasses 100 may include an integrated map of the user's surroundings. In such a case, the smart glasses 100 may provide audible or tactile directional feedback to the user. For example, the user may receive an audible instruction to use the left hand or the right hand, the make a left turn or a right turn, to extend the left or right hand by a calculated distance, etc. However, the audible instructions may not always provide precise guidance to the user. When more precise guidance is desired, coded instructions may be used to provide tactile feedback to the user's hand. For example, a single pulse (beep) may indicate turn left, while two pulses (beeps) may indicate to turn right.

Figure 14A:
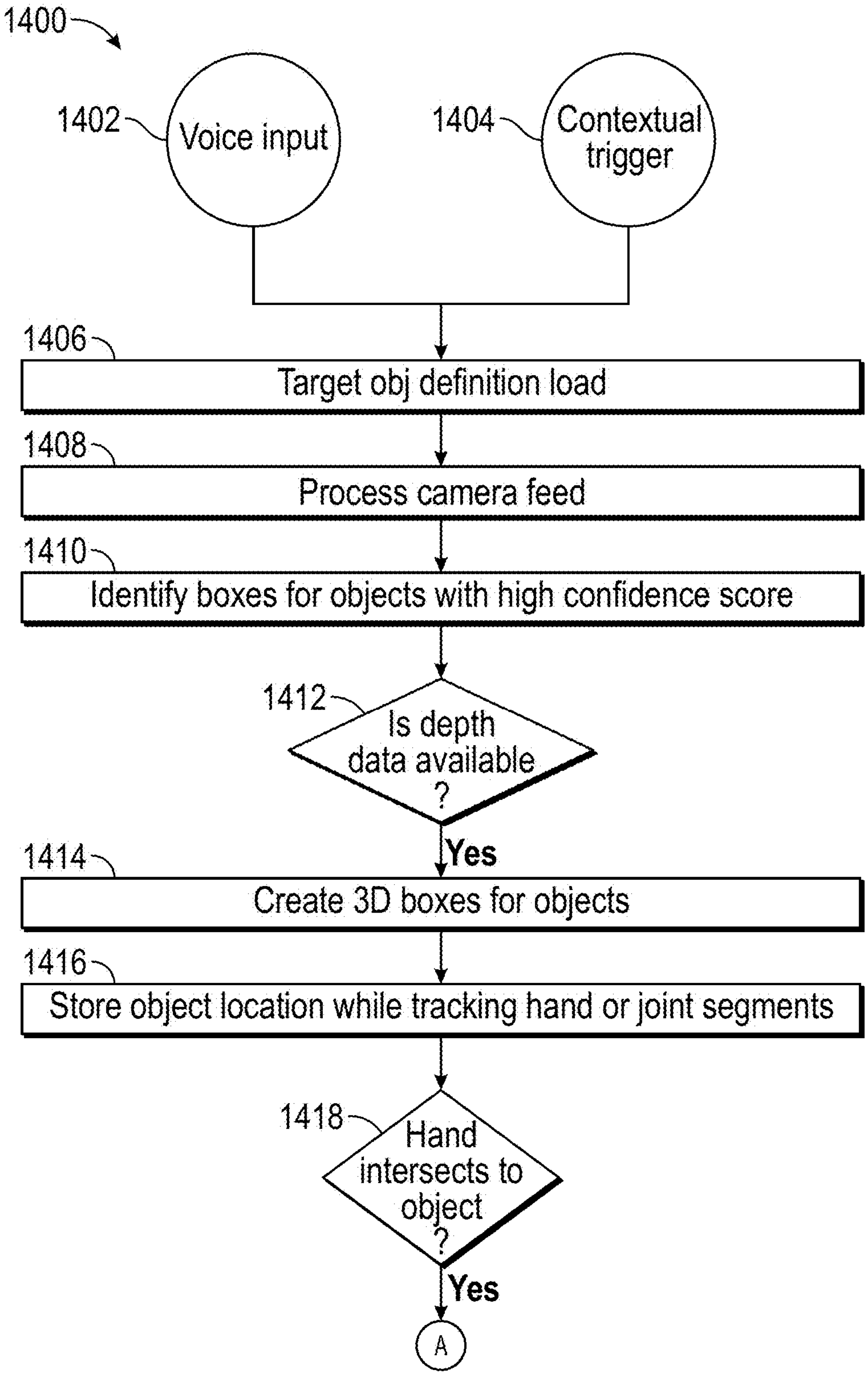
FIGS. 14A and 14B together illustrate a flowchart for providing feedback to a user in a sample configuration.
Figure 14B:
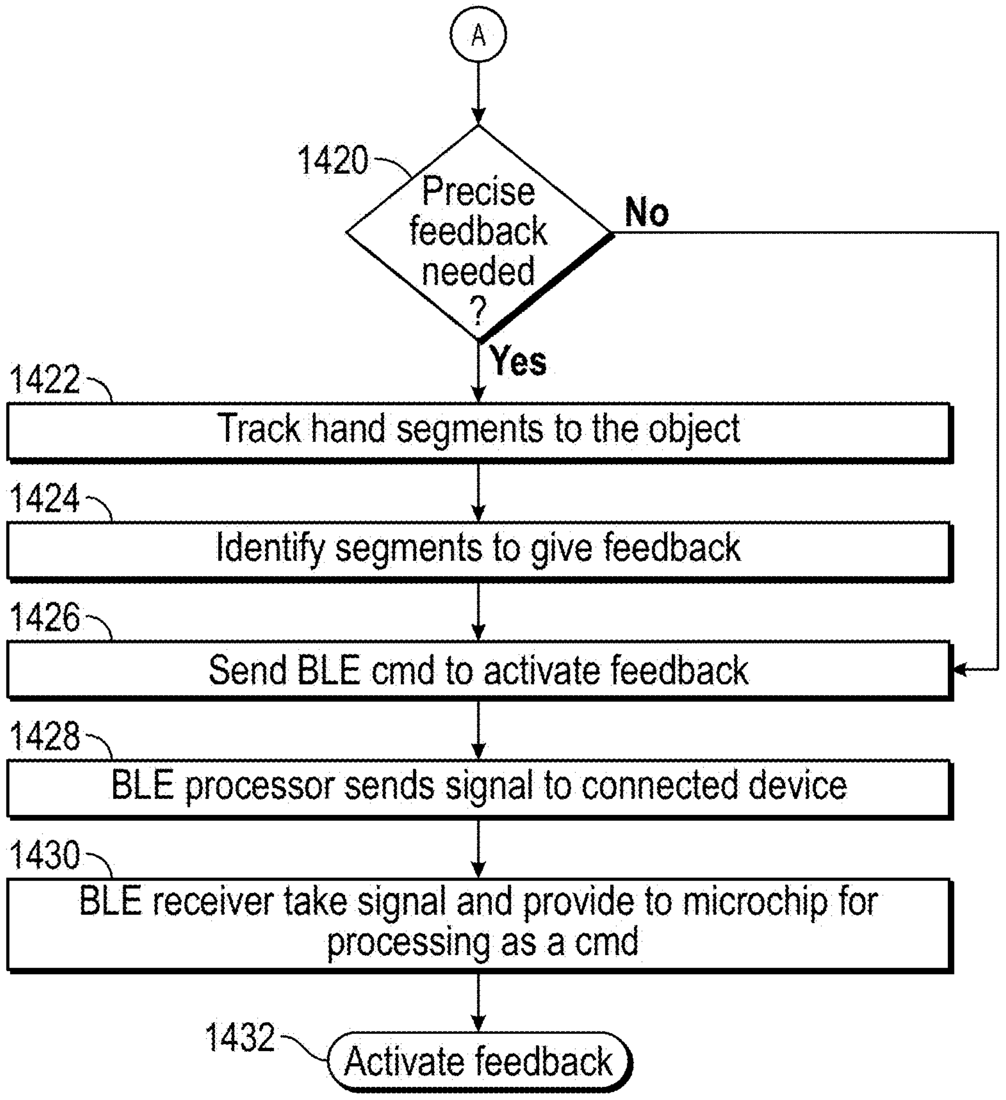

FIGS. 14A and 14B together illustrate a flowchart 1400 for providing feedback to a user in a sample configuration.

As illustrated, the process starts in response to user voice input 1402 or a contextual trigger 1404 to identify a target object. For example, the user may say "find coffee cup" or a coffee cup may be identified in the scene by the smart glasses 100 and audibilized to the user. As described above with respect to FIGS. 8A and 9, the objects in the user's surroundings may be identified by training machine learning models selected based on the user's input and environment (e.g., the user may select a model or a model may be provided based on context or extrapolated from the user's request) using a data set directed to objects that may be in the user's surroundings. Data sets may also be used to train machine learning models for tracking a hand using a hand model. Also, gesture tracking algorithms may be used to track movement of the hand model. The trained machine learning models also may be used to identify the objects in the user's surroundings that may be identified from a scan of the user's surroundings by the smart glasses 100. It will be appreciated by those skilled in the art that the machine learning models may be changed by the user or based on context to make the feedback feature more dynamic for the user.

At 1406, the definition of the target object (e.g., coffee cup) is loaded. For example, a 3D volume mesh of the target object is loaded. The 3D volume mesh may define a bounding box of the target object and a bounding box of the user's hand. In other configurations, the object may be defined in 2D coordinates.

At 1408, the camera feed is processed by the smart glasses 100 as described above to identify the target object.

At 1410, bounding boxes for the objects with a sufficiently high confidence score are identified. The bounding boxes may define the edges of the object(s) or a tessellation (mesh) of the object(s) for more precision.

At 1412, it is determined if depth data is available. If so, the smart glasses 100 create 3D boxes for the objects at 1414.

The location of the object is stored at 1416 while the smart glasses 100 continue tracking of the hand or joint segments. The smart glasses 100 may track the hand using a model of the hand or may track each joint in the hand as determined from the hand model.

When it is determined at 1418 that the hand or joint segments intersect the tracked object (e.g., have the same or approximately the same coordinates), a determination is made at 1420 whether precise feedback is needed. If precise feedback is needed, the distance and orientation of the hand segments (e.g., hand segments including buzzers 1302 in FIG. 13A) relative to the object are tracked at 1422.

The smart glasses 100 further identify at 1424 the hand segments to which feedback is to be provided (e.g., haptic feedback via a buzzer 1302 or 1308).

Whether precise feedback or coarse feedback is desired, a BLUETOOTH® low energy (BLE) command to activate the feedback is provided by the smart glasses 100 at 1426. For example, the command may provide feedback designed to instruct the user to move the user's hand back into the image frame (e.g., within the field of view of the smart glasses 100), to mark a spot in the user's gesture, to walk through a scene to place markers in the scene so that the user may be guided back to the markers at a later time, to advance the hand toward the object, and the like.

Upon receipt of the BLE command, the processor 932 of smart glasses 100 may send a signal at 1428 to the connected device (e.g., glove 1300 in FIG. 13A or the smart watch 1310 or fingertip sensor 1308 in FIG. 13B) via high speed wireless circuitry 936 and the high speed wireless connection 937 (FIG. 9). The command directs movement of a single finger, multiple fingers, or the entire hand by selectively sending a signal(s) to the respective sensors 1302 or 1308 for buzzing or pressing against the user's hand joints.

At 1430, the BLUETOOTH® module 1304 of FIG. 13A or the smart watch 1310 or fingertip sensor 1308 of FIG. 13B receives the BLE command and processes the BLE command to determine what type of feedback is to be provided. For example, the command may indicate which buzzer(s) 1302 to activate and the voltage and frequency to apply based on the distance to the object. The distance may include the distance to edges of the 3D volume of the object or a calculated mid-point of the object based on the last known location.

At 1432, the feedback is activated in response to the received command. For example, the BLUETOOTH® module 1304 of FIG. 13A may control each buzzer 1302 to selectively vibrate or buzz based on a frequency and voltage determined by the smart glasses 100 based on the distance of the respective buzzer 1302 to the object. It will be appreciated that coarse guidance of the user's arm may be provided while precise guidance is provided for the fingertip of the user's pointer finger by providing the corresponding control signals to the respective buzzers 1302.

The process may repeat as at least one of the hand and the target object are moved relative to one another. As noted above, the voltage and frequency of the activation signals may be adjusted as the user's hand gets closer or farther away from the target object. The activation signals may be deactivated once the hand touches the object, which may be detected by corresponding coordinates of the hand and object, capacitive feedback to the glove 1300, and the like.

It will be appreciated by those skilled in the art that the techniques described herein may be used not only to guide the user's hand to objects to enable the objects to be picked up, but also the techniques described herein may be used to control electronic devices. For example, the smart glasses 100 may be asked to identify a microwave or a toaster in the user's surroundings. The user would then be guided to the microwave or toaster and the user's hand guided to the start button of the microwave or the lever of the toaster using at least one of audio or haptic feedback that may increase in frequency as the user gets closer.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system that provides feedback to a user to guide the user to an object, comprising:

a frame configured to be worn on a head of the user;

at least one camera mounted on the frame;

a processor adapted to identify a target object and a hand of the user in a field of view of the at least one camera, to track relative positions of the hand relative to an identified object, to determine whether precise feedback is desired, when precise feedback is desired, to determine a distance and orientation of hand segments of the hand relative to the target object, to generate at least one control signal for guiding the hand of the user to the identified object, and when precise feedback is desired, to guide at least one fingertip of the hand of the user to the target object;

a communication device associated with the processor that communicates the at least one control signal; and a user feedback device configured to be worn on or adjacent the hand of the user and adapted to receive the at least one control signal from the communication device and to convert the at least one control signal into at least one of sounds or haptic feedback that guides at least one of the hand or the at least one fingertip to touch the identified object.

2. The system of claim 1, wherein the frame, at least one camera, processor, and communication device are integrated into smart glasses.

3. The system of claim 1, wherein the user feedback device comprises a glove configured to fit the user's hand and to include at least one sensor adapted to at least one of buzz or vibrate in response to the at least one control signal from the communication device to guide the user's hand to the identified object.

4. The system of claim 3, wherein the at least one sensor comprises at least one of piezoelectric sensors or mini-vibration disc motors.

5. The system of claim 3, wherein the glove includes sensors at multiple hand joints on the glove.

6. The system of claim 3, wherein the glove further comprises a communication module adapted to receive the at least one control signal from the communication device and to control the at least one sensor to at least one of buzz or vibrate in response to the at least one control signal.

7. The system of claim 6, wherein the communication module is connected to the at least one sensor via at least one wire.

8. The system of claim 6, wherein the communication module communicates with the at least one sensor via a wireless connection.

9. The system of claim 8, wherein the communication device and the communication module communicate via a BLUETOOTH® low energy wireless connection.

10. The system of claim 6, wherein the processor uses a hand model that defines a geometric location of each sensor of the at least one sensor to generate a control signal for each sensor of the at least one sensor.

11. The system of claim 10, wherein the communication module receives and distributes the control signal for each sensor of the at least one sensor according to the hand model.

12. The system of claim 1, wherein the user feedback device comprises a smart watch that communicates with at least one sensor on the user's hand adapted to at least one of buzz or vibrate in response to the at least one control signal from the communication device to guide the user's hand to the identified object.

13. The system of claim 12, wherein the at least one sensor comprises a fingertip sensor that receives a control signal from the smart watch via at least one of a wired or wireless connection.

14. The system of claim 1, wherein at least one of a voltage or a frequency of the at least one control signal is modulated in accordance with a distance the hand is from the identified object.

15. The system of claim 14, wherein at least one of the sounds or the haptic feedback increases in frequency as the user's hand approaches the identified object and decreases in frequency as the user's hand is moved farther away from the identified object and stops once the user's hand touches the identified object.

16. The system of claim 2, wherein the smart glasses include a map of the user's surroundings and the processor generates the at least one control signal to provide at least one of audible or tactile directional feedback to the user.

17. A method of providing feedback to a user to guide the user to an object, comprising:

receiving at least one of a user voice input or a contextual trigger to identify a target object in a scene;

identifying the target object using a camera mounted on a frame configured to be worn on a head of the user and a processor adapted to identify the target object and a hand of the user in a field of view of the camera;

tracking, using at least the processor, relative positions of the hand relative to the target object;

determining whether precise feedback is desired;

when precise feedback is desired, determining a distance and orientation of hand segments of the hand relative to the target object;

generating, using at least the processor, at least one control signal for guiding the hand of the user to the target object and, when precise feedback is desired, for guiding at least one fingertip of the hand of the user to the target object;

communicating the at least one control signal to a user feedback device configured to be worn on or adjacent the hand of the user and adapted to receive the at least one control signal; and providing at least one of sound or haptic feedback, using the user feedback device, in response to the at least one control signal to guide at least one of the hand or the at least one fingertip to touch the target object.

18. The method of claim 17, wherein identifying the target object comprises generating a scan of the user's surroundings with the camera and training machine learning models selected based on at least one of the user's input or environment using a data set directed to objects in the scan of the user's surroundings.

19. The method of claim 17, wherein providing at least one of sound or haptic feedback to the user comprises using the user feedback device to guide the hand to touch the target object and using the user feedback device to guide the user's hand to a control feature of the target object, whereby the at least one of sound or haptic feedback increases in frequency as the user's hand gets closer to the control feature of the target object.

20. A non-transitory computer readable medium comprising instructions stored thereon that are executable by at least one processor to cause a computing device to perform operations comprising:

receiving at least one of a user voice input or a contextual trigger to identify a target object in a scene;

capturing, using at least one camera mounted on a frame configured to be worn on a head of the user, a scene including a target object;

identifying the target object and a hand of the user in a field of view of the at least one camera;

tracking relative positions of the hand relative to the target object;

determining whether precise feedback is desired;

when precise feedback is desired, determining a distance and orientation of hand segments of the hand relative to the target object;

generating at least one control signal for guiding the hand of the user to the target object and, when precise feedback is desired, for guiding at least one fingertip of the hand of the user to the target object; and communicating the at least one control signal to a user feedback device configured to be worn on or adjacent the hand of the user and adapted to receive the at least one control signal, wherein the user feedback device provides at least one of sound or haptic feedback in response to the at least one control signal to guide at least one of the hand or the at least one fingertip to touch the target object.

* * * * *